United States Patent
Ly et al.

(10) Patent No.: US 12,471,003 B2
(45) Date of Patent: Nov. 11, 2025

(54) CONTENTION-FREE RIS HANDOVER VIA BARRING

(71) Applicant: QUALCOMM Incorporated, San Diego, CA (US)

(72) Inventors: Hung Dinh Ly, San Diego, CA (US); Yu Zhang, San Diego, CA (US); Saeid Sahraei, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 18/273,512

(22) PCT Filed: Mar. 16, 2021

(86) PCT No.: PCT/CN2021/080947
§ 371 (c)(1),
(2) Date: Jul. 20, 2023

(87) PCT Pub. No.: WO2022/193112
PCT Pub. Date: Sep. 22, 2022

(65) Prior Publication Data
US 2024/0107423 A1 Mar. 28, 2024

(51) Int. Cl.
*H04W 48/02* (2009.01)
*H04B 7/04* (2017.01)
*H04W 36/08* (2009.01)

(52) U.S. Cl.
CPC ........ *H04W 48/02* (2013.01); *H04B 7/04013* (2023.05); *H04W 36/08* (2013.01)

(58) Field of Classification Search
None
See application file for complete search history.

(56) References Cited

U.S. PATENT DOCUMENTS

| 2016/0142991 A1 | 5/2016 | Classon et al. |
| 2021/0384637 A1* | 12/2021 | Sciancalepore ...... H01Q 15/148 |
| 2021/0384958 A1* | 12/2021 | Denis ................... H04B 7/145 |

FOREIGN PATENT DOCUMENTS

| CN | 111010219 A | 4/2020 |
| CN | 111245492 A | 6/2020 |

(Continued)

OTHER PUBLICATIONS

International Search Report and Written Opinion—PCT/CN2021/080947—ISA/EPO—Dec. 15, 2021.

(Continued)

*Primary Examiner* — Hong S Cho
(74) *Attorney, Agent, or Firm* — Procopio, Cory, Hargreaves & Savitch LLP

(57) ABSTRACT

A method, apparatus, and system for barring at least one UE from communicating with one or more RISs is disclosed. A base station may determine to bar at least one UE from communicating with one or more RISs of a plurality of RISs. The base station may transmit, to the at least one UE, a barring indication for the one or more RISs. The barring indication may identify the one or more RISs with which the at least one UE is barred from communicating. The UE may determine to refrain from communicating with the one or more RISs based on the barring indication. The UE may communicate with the base station based on the determination to refrain from communicating with the one or more RISs.

33 Claims, 13 Drawing Sheets

(56) References Cited

FOREIGN PATENT DOCUMENTS

CN     111416646 A    7/2020
CN     112073092 A    12/2020

OTHER PUBLICATIONS

ZTE, et al., "Support of Reconfigurable Intelligent Surface for 5G Advanced", 3GPP Draft, 3GPP TSG RAN Meeting #91e, RP-210618, Electronic Meeting, Mar. 16, 2021-Mar. 21, 2021, Mar. 15, 2021, 7 Pages, the whole document, pp. 2-6.
Nemati M., et al., "RIS-Assisted Coverage Enhancement in Millimeter-Wave Cellular Networks", Arxiv.Org, Cornell University Library, 201 Olin Library Cornell University Ithaca, NY 14853, arXiv:2007.08196v1 [eess.SP], Jul. 16, 2020, XP081721703, pp. 1-12, col. 7 column 8, figure 4.
Supplementary European Search Report—EP21930708—Search Authority—Munich—Oct. 31, 2024.

* cited by examiner

CONTENTION-FREE RIS HANDOVER VIA BARRING

CROSS REFERENCE TO RELATED APPLICATION(S)

This application is National Stage Application filed under 35 U.S.C. § 371 of PCT International Application Serial No. PCT/CN2021/080947 entitled "CONTENTION-FREE RIS HANDOVER VIA BARRING" and filed on Mar. 16, 2021, which is expressly incorporated by reference herein in its entirety.

BACKGROUND

Technical Field

The present disclosure relates generally to communication systems, and more particularly, to barring a user equipment (UE) from communicating with a reconfigurable intelligent surface (RIS) in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The apparatus may receive, from a base station, a barring indication for one or more RISs of a plurality of RISs. The barring indication may identify the one or more RISs with which the UE is barred from communicating. The apparatus may determine to refrain from communicating with the one or more RISs based on the barring indication. The apparatus may communicate with the base station based on the determination to refrain from communicating with the one or more RISs.

In an aspect of the disclosure, a method, a computer-readable medium, and an apparatus are provided. The apparatus may be a base station. The apparatus may determine to bar at least one UE from communicating with one or more RISs of a plurality of RISs. The apparatus may transmit, to the at least one UE, a barring indication for the one or more RISs. The barring indication may identify the one or more RISs with which the at least one UE is barred from communicating. The apparatus may communicate with the at least one UE based on the barring indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
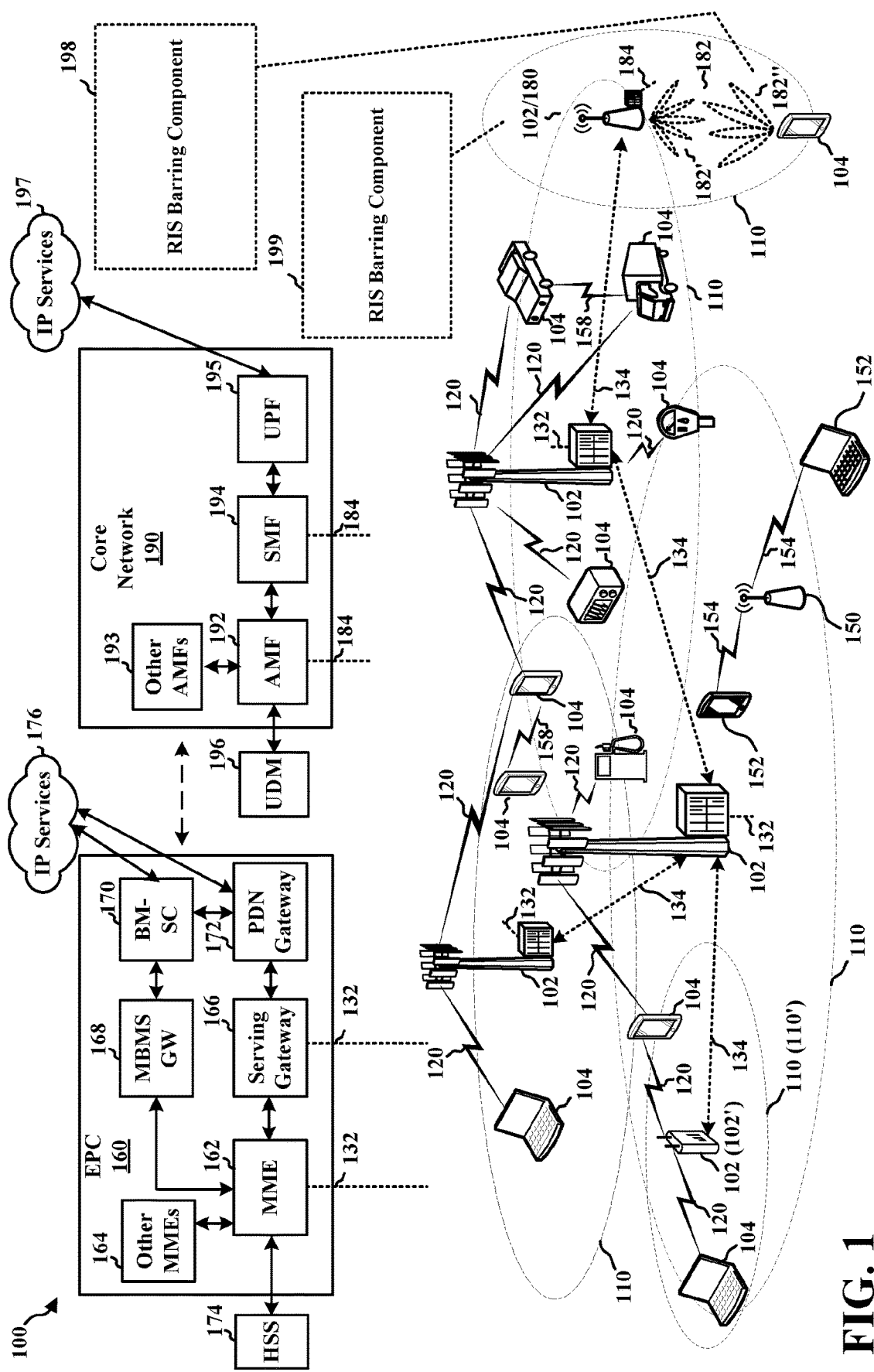
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (IMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a RIS barring component 198 that may be configured to receive, from a base station, a barring indication for one or more RISs of a plurality of RISs. The barring indication may identify the one or more RISs with which the UE is barred from communicating. The RIS barring component 198 may be configured to determine to refrain from communicating with the one or more RISs based on the barring indication. The RIS barring component 198 may be configured to communicate with the base station based on the determination to refrain from communicating with the one or more RISs. In certain aspects, the base station 180 may include a RIS barring component 199 that may be configured to determine to bar at least one UE from communicating with one or more RISs of a plurality of RISs. The RIS barring component 199 may be configured to transmit, to the at least one UE, a barring indication for the one or more RISs. The barring indication may identify the one or more RISs with which the at least one UE is barred from communicating. The RIS barring component 199 may be configured to communicate with the at least one UE based on the barring indication. Although the following description may be focused on 5GNR, the concepts described herein may be applicable to other similar areas, such as LTE, LTE-A, CDMA, GSM, and other wireless technologies.

Figure 2:
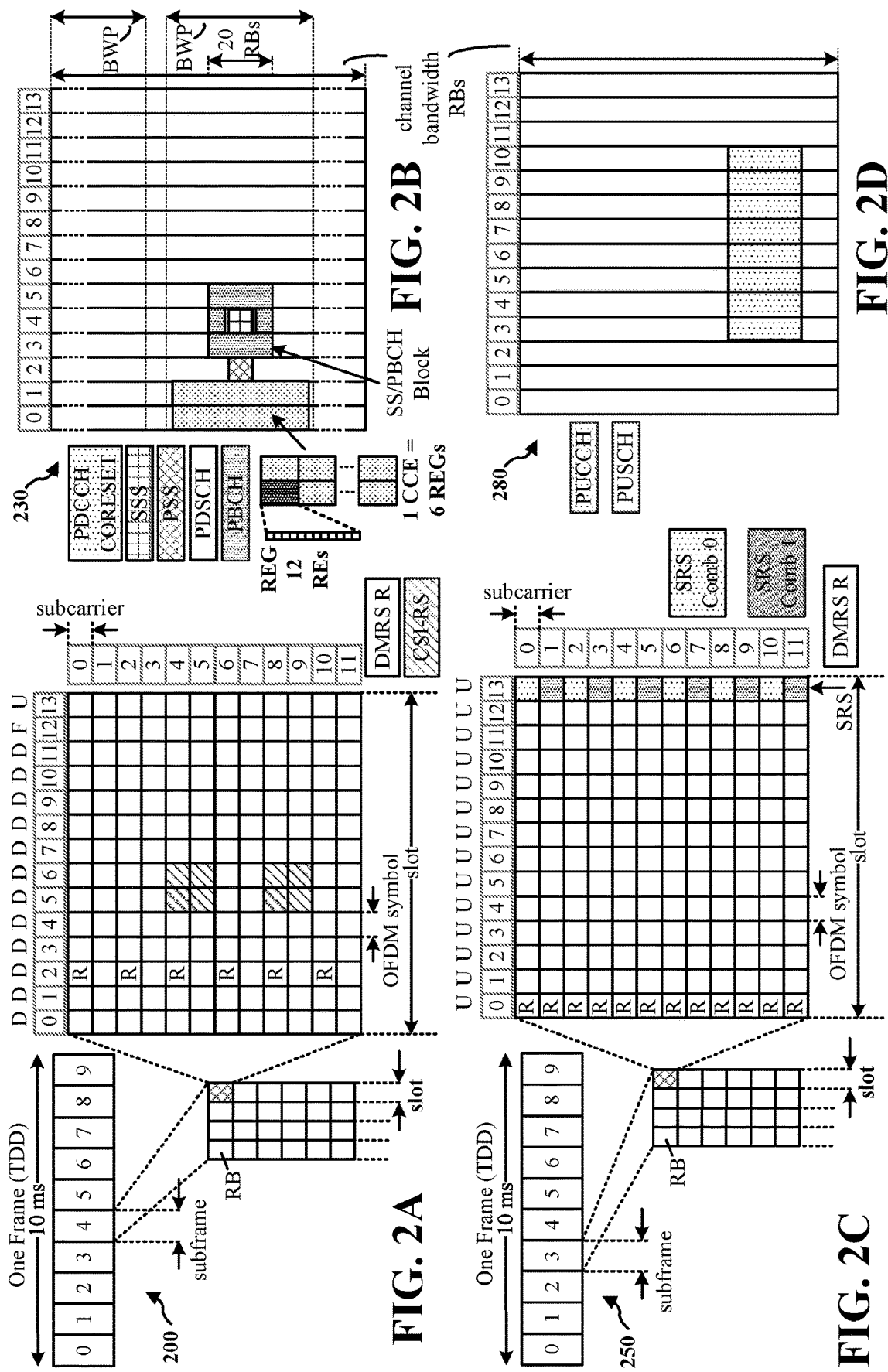
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 29 slots/subframe. The subcarrier spacing and symbol length/duration are a function of the numerology. The subcarrier spacing may be equal to $2^{\mu}*15$ kHz, where y is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
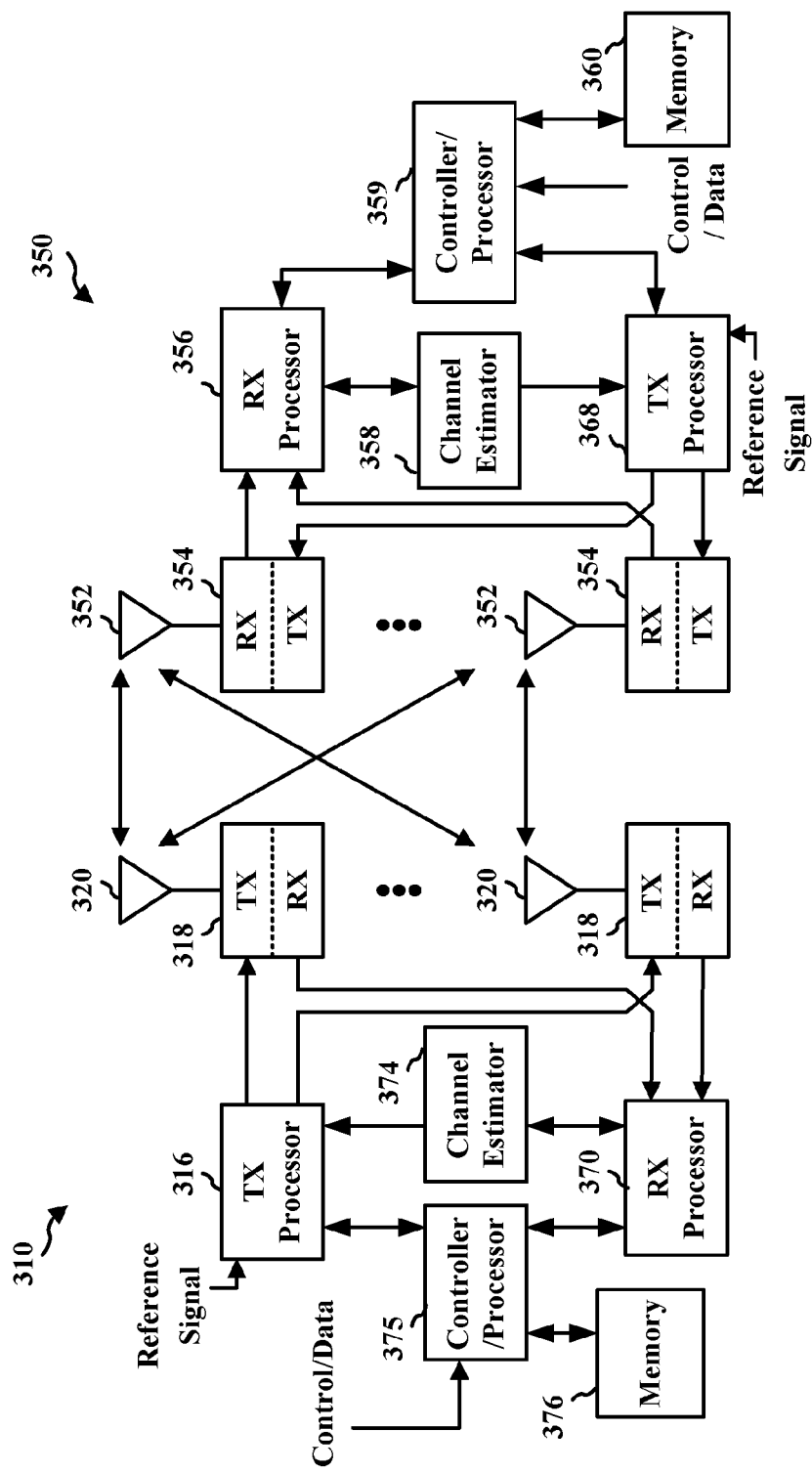
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In some wireless communications systems (e.g., systems implementing a MIMO communication scheme), wireless devices may implement spatial division multiple access (SDMA) to increase signaling throughput. For example, abase station may use beamforming techniques to communicate with multiple UEs concurrently by using spatial dimensions provided by an environment. However, in some cases, physical proximity or environmental factors (e.g., interference, blockage) may impair beamforming communications between the base station and the multiple UEs. In some cases, to overcome such impairments, the base station may employ an active antenna unit (AAU) to act as a relay between the base station and the multiple UEs. The AAU may include one or more antenna ports, RF chains, and power amplifiers. The AAU may allow the base station to increase spatial diversity, beamforming gain, and cell coverage. For example, the AAU may receive a beamformed communication from the base station, amplify the beamformed communication, and re-transmit the beamformed communication to a UE. As such, in comparison to receiving the beamformed communication directly from the base station, the UE may have a higher likelihood of successfully receiving the beamformed communication via the AAU. However, active components (e.g., RF chains, power amplifiers) used by the AAU to amplify signals may be associated with increased power consumption. For example, a power amplifier at the AAU may utilize a significant power overhead to amplify and re-transmit a received signal. Such power overhead may be undesirable and inefficient in some systems.

In some examples, the base station may employ a RIS that uses passive components (e.g., capacitors, resistors, etc.) to reflect incoming signals in one or more directions without utilizing a significant power overhead. For example, the RIS may use a capacitor and a resistor to reflect a signal in a specific direction (e.g., instead of using a power amplifier to amplify and re-transmit the signal). As such, the RIS may increase cell coverage, spatial diversity, and beamforming gain while consuming less power than an AAU. In some aspects, the base station may dynamically configure the RIS to reflect an incoming signal in a specific direction. For example, the base station may configure the RIS to reflect a beamformed communication in a direction of a UE based on a location of the UE. Similarly, the UE may transmit a beamformed communication in a direction of the RIS based on a base station configuration or a UE selection. To effectively implement the RIS, the base station may indicate configuration information for the RIS to the UE. The configuration information may include a location of the RIS, an uplink reflection angle of the RIS, a downlink reflection angle of the RIS, or a combination thereof. In some examples, the base station may transmit, to the UE (e.g., via a RIS), configuration information for multiple RISs in a coverage area of the base station. The UE may select one of the multiple RISs to facilitate communication with the base station based on the configuration information for the multiple RISs. In some aspects, the UE may transmit, to the base station, feedback indicating the selected RIS.

The base station may communicate with multiple UEs via one or more RISs using RDMA. For example, the base station may subdivide a RIS into multiple subsets of elements and use different subsets of elements to communicate with different UEs. Additionally or alternatively, the base station may use multiple RISs distributed throughout the coverage area to communicate with the multiple UEs. In some examples, the base station may use multiple RISs to communicate with a single UE. For example, if a path between a UE and the base station using a first RIS is obstructed, experiences interference, or otherwise drops below a quality or signal strength threshold, the base station may use a second RIS to communicate with the UE via a different path. As such, RDMA may provide increased spatial diversity, cell coverage, and throughput, among other benefits. To effectively implement RDMA, the base station may transmit configuration information for one or more RISs to each of the multiple UEs. In some aspects, the configuration information may identify a specific RIS and a set of time and frequency resources associated with the specific RIS. For example, the base station may indicate, to at least one UE of the multiple UEs, an identifier of a RIS, a configuration of the RIS, and a resource allocation associated with the RIS. As such, the base station may allocate, to at least one UE, RIS resources in addition to time and frequency resources in a resource allocation for communications. The base station may utilize the one or more RISs in RDMA to facilitate communications between the base station and one or more UEs in a wireless communications system.

In one aspect, to prevent RIS overloading, or for any other reasons, the base station may configure at least one UE to bar the at least one UE from communicating with one or more RISs.

Figure 4:
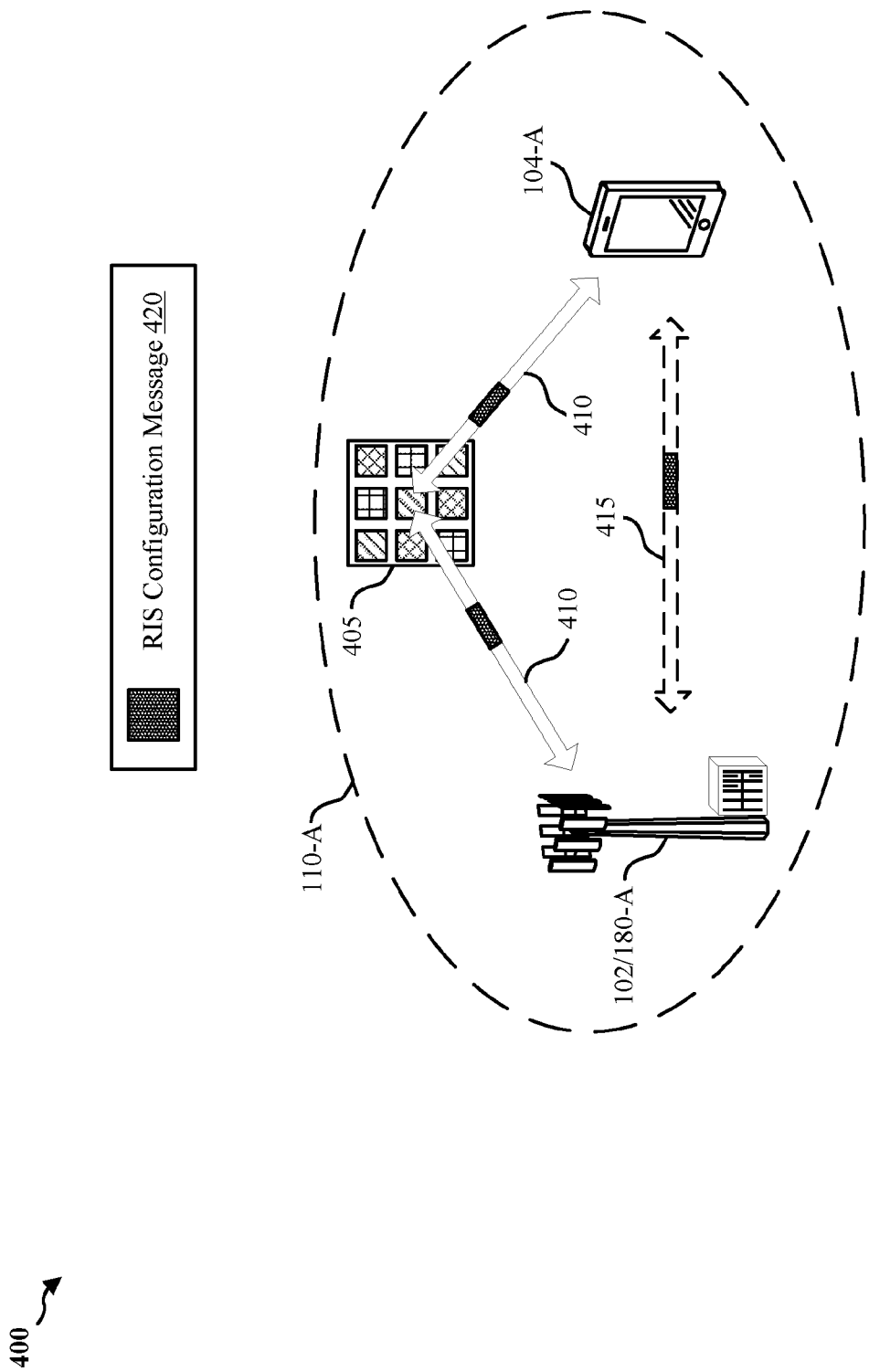
FIGS. 4 through 7 illustrate examples of wireless communications systems that support communicating RIS information to support RIS-division multiple access (RDMA) in accordance with aspects of the present disclosure.

FIG. 4 illustrates an example of a wireless communications system 400 that supports communicating RIS information to support RDMA in accordance with aspects of the present disclosure. The wireless communications system 400 may implement aspects of the wireless communications system 100. For example, the wireless communications system 400 may include a UE 104-A and abase station 102/180-A, which may be examples of corresponding devices described herein with reference to FIG. 1. In some aspects, the UE 104-A and the base station 102/180-A may communicate within a geographic coverage area 110-A of the base station 102/180-A and may use a RIS 405 to communicate via a communication link 410. The base station 102/180-A may transmit, to the UE 104-A via the communication link 410 or a direct communication link 415, a RIS configuration message 420 that indicates configuration information for a RIS 405. The RIS configuration message 420 may support the UE 104-A selecting a RIS 405 based on the indicated configuration information and communicating with the base station 102/180-A via the selected RIS 405. Utilizing the selected RIS 405 may, in turn, allow the UE 104-A and the base station 102/180-A to communicate with increased spatial diversity, beamforming gain, and reliability.

In some systems, a base station 102/180-A may determine a configuration of a RIS 405. Based on the determined configuration of the RIS 405, the base station 102/180-A may generate a RIS configuration message 420. In some examples, the base station 102/180-A may transmit the RIS configuration message 420 to the UE 104-A via the RIS 405 using the communication link 410. In some other examples, the base station 102/180-A may transmit the RIS configuration message 420 directly to the UE 104-A over the direct communication link 415. Based on the RIS configuration information, the UE 104-A may select the RIS 405 to facilitate communications with the base station 102/180-A. Based on selecting the RIS 405, the UE 104-A may communicate with the base station 102/180-A via the RIS 405.

The RIS 405 may be a near passive device that reflects incoming signals in a specific direction according to a configuration of the RIS 405. In some examples, the configuration of the RIS 405 may be preconfigured, statically or semi-statically configured, or configured by a network (e.g., configured by the base station 102/180-A). For example, the base station 102/180-A may transmit a message to the RIS 405 configuring one or more elements of the RIS. The RIS 405 may include a processing component (e.g., a processor) that may determine a configuration for the RIS 405 (e.g., based on a message from the base station 102/180-A) and may adjust one or more parameters of the RIS 405 to support the configuration. For example, the RIS 405 may use one or more capacitors, resistors, and other passive components to reflect signals between the base station 102/180-A and the UE 104-A (e.g., rather than using active components to amplify and re-transmit the signals). The RIS 405 may adjust the capacitors, resistors, or combination thereof to support a specific configuration for one or more elements of the RIS 405 (e.g., based on a configuration message from the base station 102/180-A). The RIS 405 may have a wired connection or a wireless connection with the base station 102/180-A and may be located anywhere in the coverage area 110-A of the base station 102/180-A.

In some cases, the configuration information of the RIS configuration message 420 may indicate a location of the RIS 405, an uplink reflection angle of the RIS 405, a downlink reflection angle of the RIS 405, or a combination thereof. In some examples, the base station 102/180-A may indicate the location, the uplink reflection angle, the downlink reflection angle, or a combination thereof as relative or explicit values. Additionally or alternatively, the RIS configuration message 420 may indicate a set of time and frequency resources associated with the RIS 405. For example, the base station 102/180-A may allocate a frequency and a time slot to the UE 104-A for a beamformed communication based on a configuration of the RIS 405.

In some examples, the base station 102/180-A may determine the configuration of the RIS 405 based on a location of the UE 104-A. For example, the base station may adjust a reflection angle (e.g., an uplink reflection angle) of the RIS 405 based on the location of the UE 104-A so that a signal transmitted from the UE 104-A is properly deflected to the base station 102/180-A. In some examples, the base station 102/180-A may adjust a configuration of the RIS 405 periodically. For example, the RIS 405 may support different uplink reflection angles, downlink reflection angles, or both in different symbols, sub-slots, slots, subframes, frames, or some combination thereof.

In some cases, the UE 104-A may transmit, to the base station 102/180-A, a feedback message in response to the RIS configuration message 420. The feedback message may indicate a selection of the RIS 405. The UE 104-A may select the RIS 405 to facilitate communications with the base station 102/180-A based on a location of the UE 104-A, a location of the base station 102/180-A, a location of the RIS 405 indicated by the RIS configuration message 420, an uplink reflection angle of the RIS 405 indicated by the RIS configuration message 420, a downlink reflection angle of the RIS 405 indicated by the RIS configuration message 420, a signal measurement (e.g., reference signal received power (RSRP), reference signal received quality (RSRQ), received signal strength indicator (RSSI), signal-to-noise ratio (SNR), signal-to-noise plus interference ratio (SNIR), signal-to-interference plus noise ratio (SINR)) associated with the direct communication link 415, the communication link 410 via the RIS 405, or both, or a combination thereof. In some examples, the UE 104-A may transmit the feedback message via the RIS 405 using the communication link 410. For example, the UE 104-A may transmit the feedback message in a direction of the RIS 405 and the RIS 405 may reflect the feedback message in a direction of the base station 102/180-A based on an uplink reflection angle of the RIS 405. In some aspects, the feedback message may be a UCI message, a MAC control element (CE) (MAC-CE), or an RRC message.

In some examples, the RIS 405 may provide increased spatial diversity, beamforming gain, and cell coverage. For example, if the direct communication link 415 between the base station 102/180-A and the UE 104-A is obstructed, the base station 102/180-A may use the communication link 410 to maintain communications with the UE 104-A via the RIS 405. As such, the RIS 405 may provide spatial diversity that enables the UE 104-A and the base station 102/180-A to mitigate interference, obstructions, and fluctuating channel conditions. Thus, the RIS 405 may increase reliability of communications between the base station 102/180-A and the UE 104-A.

In some examples, the RIS configuration message 420 may be an RRC message. In some such examples, the RRC message may indicate, to the UE 104-A, configuration information for one or more RISs 405 in the network. For example, the RRC message may include a field indicating a RIS location, a field indicating an uplink RIS reflection angle, a field indicating a downlink RIS reflection angle, a field indicating a RIS reflection angle (e.g., if the RIS reflection behavior is reciprocal between uplink and downlink), a field indicating a RIS identifier, or some combination thereof. In some examples, the RRC message may include a set of fields indicating RIS locations, a set of fields indicating uplink RIS reflection angles, a set of fields indicating downlink RIS reflection angles, a set of fields indicating reciprocal RIS reflection angles, a set of fields indicating RIS identifiers, or some combination thereof to support indicating configurations for multiple RISs 405. The fields may include bit values indicating absolute values (e.g., absolute positions, absolute uplink reflection angles, absolute downlink reflection angles), relative values (e.g., relative positions, relative uplink reflection angles, relative downlink reflection angles), or some combination thereof. In some aspects, the UE 104-A may receive the RRC message directly from the base station 102/180-A or via a RIS 405. Based on the RRC message, the UE 104-A may select a RIS 405 from the one or more RISs 405 and utilize the selected RIS 405 to facilitate communications with the base station 102/180-A.

In some other examples, the RIS configuration message 420 may be a MAC-CE. In some such examples, the MAC-CE may indicate, to the UE 104-A, configuration information for one or more RISs 405 in the network. For example, the MAC-CE message may include a field indicating a RIS location, a field indicating an uplink RIS reflection angle, a field indicating a downlink RIS reflection angle, a field indicating a reciprocal RIS reflection angle (e.g., for both uplink and downlink), a field indicating a RIS identifier, or some combination thereof. In some examples, the RRC message may include a set of fields indicating RIS locations, a set of fields indicating uplink RIS reflection angles, a set of fields indicating downlink RIS reflection angles, a set of fields indicating reciprocal RIS reflection angles, a set of fields indicating RIS identifiers, or some combination thereof to support indicating configurations for multiple RISs 405 in the network. The fields may include bit values indicating absolute values (e.g., absolute positions, absolute uplink reflection angles, absolute downlink reflection angles), relative values (e.g., relative positions, relative uplink reflection angles, relative downlink reflection angles), or some combination thereof. In some aspects, the UE 104-A may receive the MAC-CE message directly from the base station 102/180-A or via a RIS 405. Based on the MAC-CE message, the UE 104-A may select a RIS 405 from the one or more RISs 405 and utilize the selected RIS 405 to facilitate communications with the base station 102/180-A.

In yet other examples, the RIS configuration message 420 may be a DCI message. In some such examples, the DCI message may allocate, to the UE 104-A, a specific RIS 405 for communications. For example, the DCI message may schedule the UE 104-A for communications. The DCI message may allocate time resources, frequency resources, and RIS resources (e.g., a specific RIS 405 or one or more specific elements of a RIS 405) for a specific communication (e.g., receiving a downlink message, transmitting an uplink message, communicating a sidelink message, or any other communication). In some examples, the DCI message may explicitly indicate the RIS 405 in a RIS identifier field. In some other examples, the DCI message may implicitly indicate the RIS 405 based on an association between the RIS 405 and a set of time resources, a set of frequency resources, or both. In yet other examples, the DCI message may implicitly indicate the time resources, the frequency resources, or both based on an indicated RIS 405 and an association between the RIS 405 and time resources, frequency resources, or both. Additionally or alternatively, the DCI message may include one or more fields indicating a location, an uplink reflection angle, a downlink reflection angle, a reciprocal reflection angle (e.g., for both uplink and downlink), or a combination thereof for the allocated RIS 405. In some aspects, the UE 104-A may receive the DCI message directly from the base station 102/180-A or via the specific RIS 405. Based on the DCI message, the UE 104-A may utilize the specific RIS 405 to facilitate the specific communication.

Figure 5:
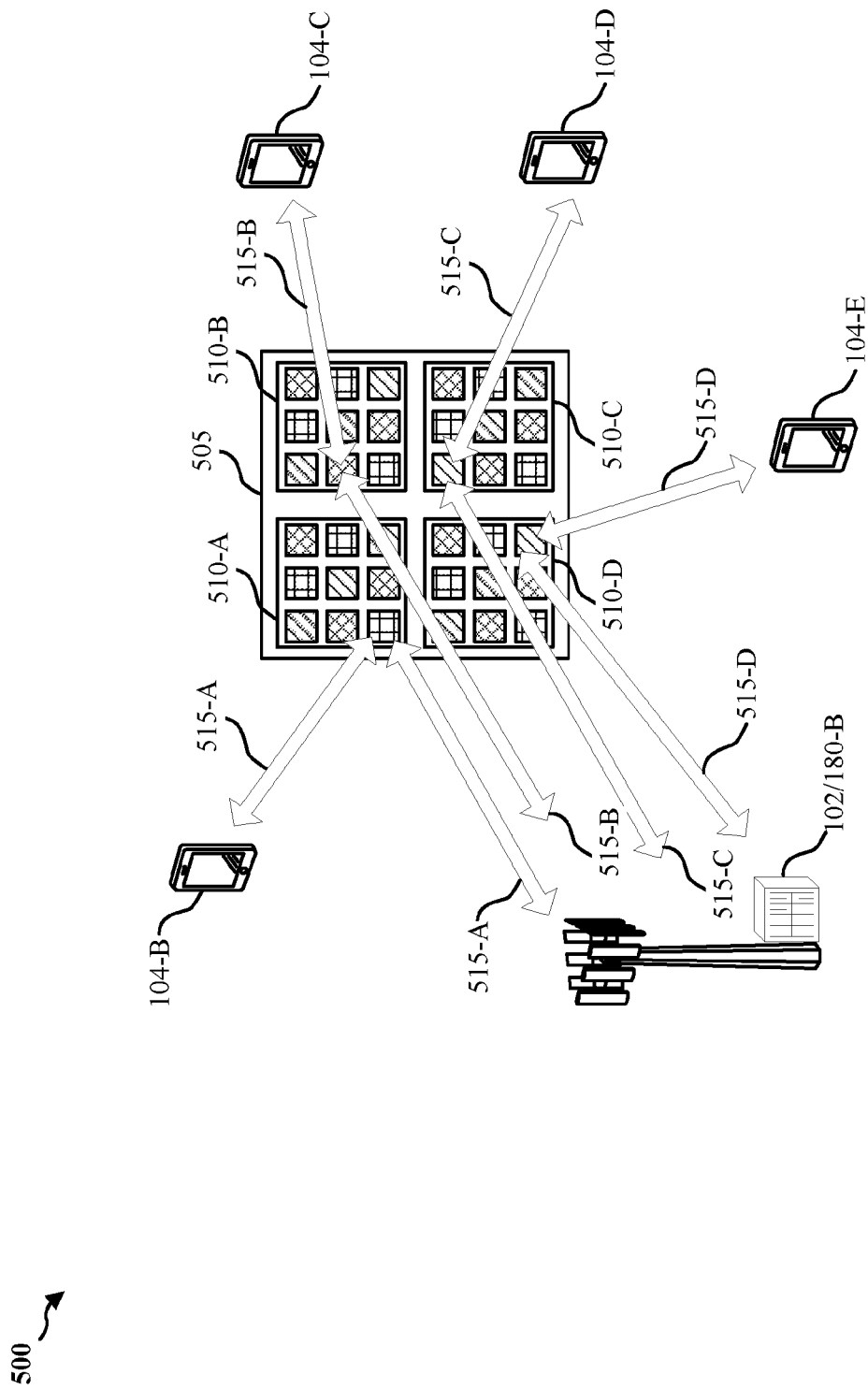

FIG. 5 illustrates an example of a wireless communications system 500 that supports communicating RIS information to support RDMA in accordance with aspects of the present disclosure. The wireless communications system 500 may implement aspects of the wireless communications systems 100 and 400. For example, the wireless communications system 500 may include a UE 104-B, a UE 104-C, a UE 104-D, a UE 104-E, and a base station 102/180-B, which may be examples of corresponding devices described herein with reference to FIGS. 1 and 4. In some aspects, the base station 102/180-B may communicate with the UE 104-B, the UE 104-C, the UE 104-D, and the UE 104-E via a RIS 505 using RDMA techniques.

In some cases, the base station 102/180-B may subdivide the RIS 505 into a set of co-located sub-RISs 510, where each sub-RIS 510 includes a subset of elements of the RIS 505. In some aspects, the term "RIS," as used herein, may refer to a single RIS, multiple RISs acting as a single entity, a sub-RIS, a RIS including multiple sub-RISs, or a combination thereof. In some examples, the subset of elements for each sub-RIS 510 may include elements that are distributed throughout the RIS 505. For example, the elements included in a sub-RIS 510-A may not be adjacent elements. In some aspects, a respective sub-RIS 510 may be assigned to a specific UE 104. For example, the sub-RIS 510-A may be assigned to the UE 104-B, a sub-RIS 510-B may be assigned to the UE 104-C, a sub-RIS 510-C may be assigned to the UE 104-D, and a sub-RIS 510-D may be assigned to the UE 104-E. That is, the elements of the RIS 505 may be partitioned into subsets, with each subset serving a different UE 104. In some cases, a subset of the RIS 505 may not serve any UE 104 for a time period, and the base station 102/180-B may assign the subset to a UE 104 upon a UE 104 accessing the network and facilitating communications with the base station 102/180-B via the RIS 505.

In some systems, the UEs 104 may use respective sub-RISs 510 to facilitate communications with the base station 102/180-B. For example, the UE 104-B may communicate with the base station 102/180-B over a communication link 515-A that is facilitated by the sub-RIS 510-A, the UE 104-C may communicate with the base station 102/180-B over a communication link 515-B that is facilitated by the sub-RIS 510-B, the UE 104-D may communicate with the base station 102/180-B over a communication link 515-C that is facilitated by the sub-RIS 510-C, and the UE 104-E may communicate with the base station 102/180-B over a communication link 515-D that is facilitated by the sub-RIS 510-D.

In some aspects, each sub-RIS 510 may be associated with a configuration that includes a location, an uplink reflection angle, a downlink reflection angle, a set of elements of a RIS 505, or some combination thereof. The base station 102/180-B may transmit, to each UE 104, an indication of a configuration for a sub-RIS 510 that has been assigned to the respective UE 104. For example, the base station 102/180-B may transmit, to the UE 104-C, an indication of a configuration for the sub-RIS 510-B. In some aspects, the base station 102/180-B may indicate a relative location of a sub-RIS 510, a relative uplink reflection angle of a sub-RIS 510, a relative downlink reflection angle of a sub-RIS 510, or a combination thereof. For example, the base station 102/180-B may transmit, to the UE 104-D, an indication of a location of the sub-RIS 510-C relative to a location of the sub-RIS 510-B. Similarly, the base station 102/180-B may transmit an indication of an uplink reflection angle of the sub-RIS 510-C relative to an uplink reflection angle of the sub-RIS 510-B, an indication of a downlink reflection angle of the sub-RIS 510-C relative to a downlink reflection angle of the sub-RIS 510-B, or both. As such, the base station 102/180-B may avoid explicitly indicating locations, uplink reflection angles, downlink reflection angles, or a combination thereof for each sub-RIS 510. For example, rather than indicating a location, an uplink reflection angle, and a downlink reflection angle for each sub-RIS 510 in a configuration message, the base station 102/180-B may indicate a location, an uplink reflection angle, and a downlink reflection angle for a first sub-RIS 510-A and may indicate a gradient value for the locations, uplink reflection angles, and downlink reflection angles of other sub-RISs 510. In addition to a location, an uplink reflection angle, a downlink reflection angle, or a combination thereof, the base station 102/180-B may also transmit, to each UE 104, an identifier for the sub-RIS 510 assigned to each respective UE 104. For example, the base station 102/180-B may transmit, to the UE 104-E, an identifier, an uplink reflection angle, a downlink reflection angle, and a location corresponding to the sub-RIS 510-D. As such, if the UE 104-E changes locations, the UE 104-E may continue to beamform towards the sub-RIS 510-D based on using the received RIS identifier, uplink reflection angle, downlink reflection angle, and location corresponding to the sub-RIS 510-D.

In some examples, the base station 102/180-B may independently configure each sub-RIS 510 based on a respective UE 104 to which each sub-RIS 510 is assigned. For example, based on a location of the UE 104-C and a location of the sub-RIS 510-B, the base station 102/180-B may configure the sub-RIS 510-B with a first configuration so that the sub-RIS 510-B deflects communications between the UE 104-C and the base station 102/180-B. Based on a location of the UE 104-D and a location of the sub-RIS 510-C, the base station may configure the sub-RIS 510-C with a second configuration so that the sub-RIS 510-C deflects communications between the UE 104-D and the base station 102/180-B. Accordingly, the base station 102/180-B may configure the sub-RIS 510-B and the sub-RIS 510-C with different configurations (e.g., different uplink reflection angles, different downlink reflection angles, or both) so that the base station 102/180-B can communicate with both the UE 104-C and the UE 104-D via the RIS 505. As such, the base station 102/180-B may perform RDMA by using the RIS 505 to multiplex the UEs 104.

In some examples, during an initial access procedure between the base station 102/180-B and the UEs 104, the base station 102/180-B may indicate a TDM communication scheme for the RIS 505. Specifically, the base station 102/180-B may indicate that an uplink reflection angle of the RIS 505, a downlink reflection angle of the RIS 505, or both are time dependent. That is, the RIS 505 may have different uplink reflection angles, different downlink reflection angles, or both in different symbols, sub-slots, slots, subframes, frames, or some combination thereof. Accordingly, the base station 102/180-B may provide, to the UEs 104, explicit scheduling information for communicating via the RIS 505. For example, the base station 102/180-B may indicate, to the UE 104-B, one or more time and frequency resources that the UE 104-B may use to communicate with the base station 102/180-B. In some aspects, the base station 102/180-B may indicate the explicit scheduling information using a DCI message. In some examples, the base station 102/180-B may allocate a specific RIS 505, sub-RIS 510, or both to the UE 104 along with the time and frequency resources. In some other examples, the UE 104 may determine the RIS 505, sub-RIS 510, or both based on the allocated time resources and the TDM configuration of the RIS 505, sub-RIS 510, or both. In some cases, the base station 102/180-B may assign the same RIS 505 or sub-RIS 510 to multiple UEs 104 in a TDM fashion.

In some examples, subdividing the RIS 505 into multiple sub-RISs 510 may reduce the complexity of performing RDMA. For example, if the UE 104-E changes locations, the base station 102/180-B may reconfigure the sub-RIS 510-D to account for the location change of the UE 104-E rather than reconfiguring the entire RIS 505. As such, subdividing the RIS 505 may reduce the processing power associated with performing RDMA for moving UEs 104. If, for example, the UE 104-B departs from the network or powers off after communicating with the base station 102/180-B via the sub-RIS 510-A, the base station 102/180-B may reconfigure the sub-RIS 510-A accordingly instead of reconfiguring the entire RIS 505. For example, if a new UE 104 connects with the base station 102/180-B, the base station 102/180-B may reconfigure the sub-RIS 510-A—previously assigned to the UE 104-B—to facilitate communications between the new UE 104 and the base station 102/180-B. Thus, subdividing the RIS 505 may also reduce the processing power associated with performing RDMA for UEs 104 connecting to and disconnecting from the network.

Figure 6:
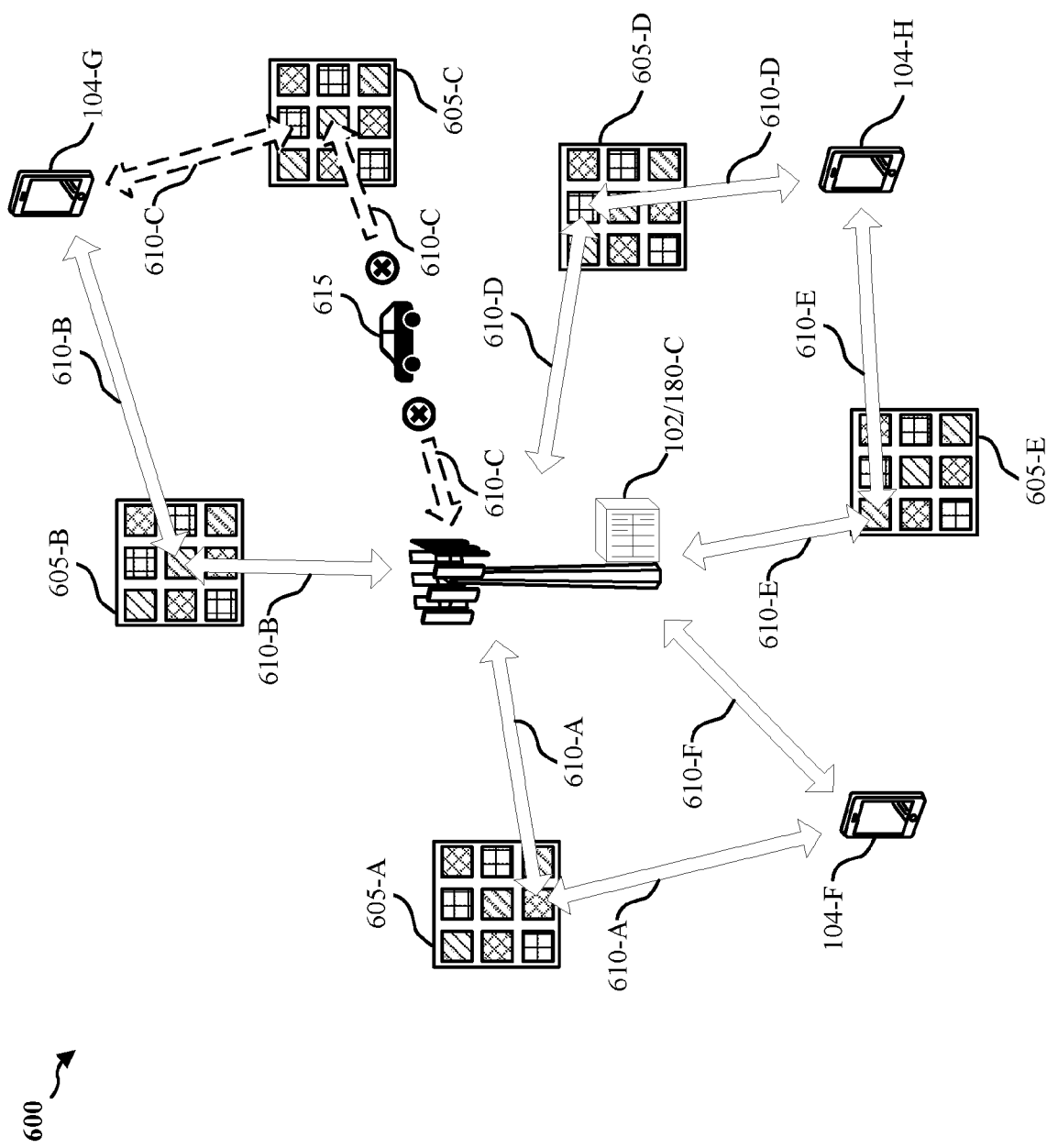

FIG. 6 illustrates an example of a wireless communications system 600 that supports communicating RIS information to support RDMA in accordance with aspects of the present disclosure. The wireless communications system 600 may implement aspects of the wireless communications systems 100, 400, and 500. For example, the wireless communications system 600 may include a UE 104-F, a UE 104-G, a UE 104-H, and a base station 102/180-C, which may be examples of corresponding devices described herein with reference to FIGS. 1, 4, and 5. In some examples, in addition or alternative to subdividing a RIS into multiple co-located sub-RISs as described with reference to FIG. 5, the base station 102/180-C may use multiple, spatially distributed RISs 605 to communicate with UEs 104 via RDMA.

In some systems, the base station 102/180-C may use multiple RISs 605 to communicate with one or more UEs 104. That is, a UE 104 may be associated with one or more RISs 605. For example, the UE 104-H may be associated with a RIS 605-D and a RIS 605-E such that the UE 104-H may communicate with the base station 102/180-C over a communication link 610-D that uses the RIS 605-D, a communication link 610-E that uses the RIS 605-E, or both. If, for example, the communication link 610-D between the base station 102/180-C and the UE 104-H is obstructed, experiences interference, or otherwise drops below a quality or signal strength threshold, the UE 104-H may use the RIS 605-E to maintain communication with the base station 102/180-C via the communication link 610-E. Additionally or alternatively, if another UE 104 is located proximate to the UE 104-H (e.g., within a threshold distance), the UE 104-H and the proximate UE 104 may use different RISs 605 to spatially differentiate signals between these UEs 104 and the base station 102/180-C. Thus, utilizing multiple distributed RISs 605 may enhance spatial diversity for communications between the base station 102/180-C and the UEs 104.

Additionally or alternatively, the base station 102/180-C may communicate with a UE 104 via a direct communication link or via a communication link that is facilitated by a RIS 605. For example, the UE 104-F may communicate with the base station 102/180-C over a direct communication link 610-F. However, if conditions of the direct communication link 610-F deteriorate (e.g., due to interference or blockage), the UE 104-F may maintain communication with the base station 102/180-C over a communication link 610-A that is facilitated by a RIS 605-A. Hence, in comparison to using a single RIS, using multiple distributed RISs 605 may offer greater spatial diversity. Further, the base station 102/180-C may generate dynamic spatial dimensions based on activating or deactivating RISs 605. For example, if the RIS 605-B is in a deactivated state and the communication link 610-C between the base station 102/180-C and the UE 104-G is obstructed (e.g., by an obstruction 615), the base station 102/180-C may activate the RIS 605-B and communicate with the UE 104-G over the communication link 610-B using the RIS 605-B.

In some examples, the base station 102/180-C may transmit, to a UE 104, configuration information for multiple distributed RISs 605. For example, the base station 102/180-C may transmit, to the UE 104-G, configuration information for a RIS 605-B and a RIS 605-C. Additionally or alternatively, the configuration information may indicate other RISs 605 in the network, such as a RIS 605-A, a RIS 605-D, and a RIS 605-E. The configuration information may include locations, uplink reflection angles, downlink reflection angles, or a combination thereof for the RISs 605. In some examples, the UE 104-G may select, based on the configuration information and locations corresponding to the UE 104-G, the base station 102/180-C, the RIS 605-B, and the RIS 605-C, whether to facilitate communications with the base station 102/180-C directly, via the RIS 605-B, or via the RIS 605-C. Additionally or alternatively, the selection may be based on reference signal measurements (e.g., RSSI, RSRP, RSRQ) associated with the RIS 605-B, the RIS 605-C, a direct link, or a combination thereof. If, for example, the UE 104-G determines that a communication link 610-C corresponding to the RIS 605-C is experiencing interference or a deterioration in channel conditions (e.g., a low RSSI below an RSSI threshold), the UE 104-C may refrain from selecting the RIS 605-C.

In some examples, a UE 104 may transmit, to the base station 102/180-C, a feedback message indicating a selection of one or more of the multiple distributed RISs 605. If, for example, the UE 104-G receives configuration information for the RIS 605-A, the RIS 605-B, the RIS 605-C, the RIS 605-D, and the RIS 605-E, the feedback message may indicate the RIS 605-B, the RIS 605-C, or both selected by the UE 104-G to facilitate communications between the UE 104-G and the base station 102/180-C. In some examples, the feedback message may also include channel state information (CSI) associated with one or more RISs 605. Based on the feedback message, the base station 102/180-C may assign one or more RISs 605 to the UE 104 such that the UE 104 may use a selected RIS 605 to facilitate communications with the base station 102/180-C.

Figure 7:
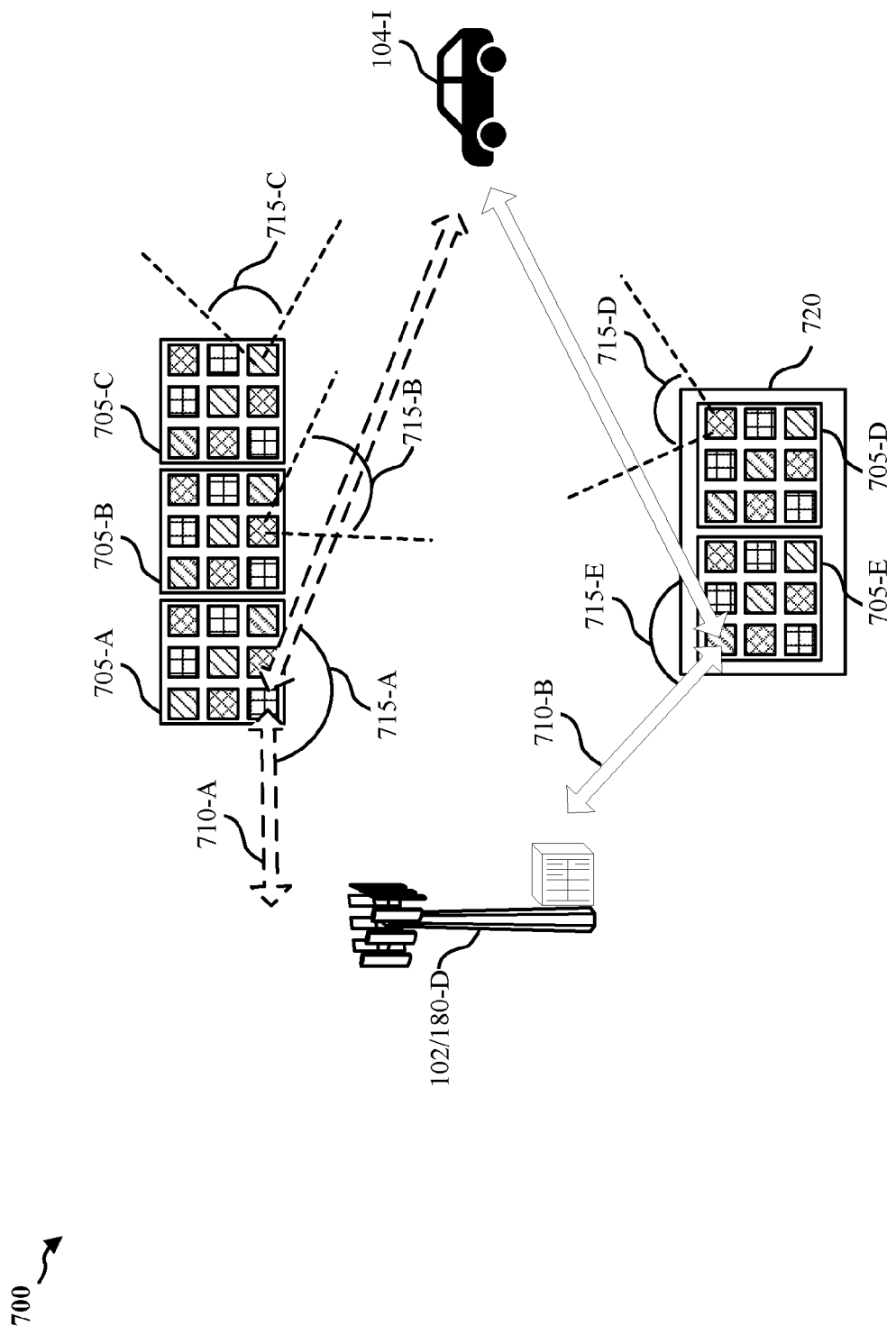

FIG. 7 illustrates an example of a wireless communications system 700 that supports communicating RIS information to support RDMA in accordance with aspects of the present disclosure. The wireless communications system 700 may implement aspects of the wireless communications systems 100, 400, 500, and 600. For example, the wireless communications system 700 may include a UE 104-I and a base station 102/180-D, which may be examples of corresponding devices described herein with reference to FIGS. 1 and 4 through 6. In some aspects, the UE 104-I may move and may perform a handover between nearby RISs 705 based on updated location information for the UE 104-I and configuration information for the nearby RISs 705.

In some examples, the UE 104-I may be a vehicle (e.g., a smart vehicle) in a V2X communication system. The movement of the UE 104-I may alter channel conditions of a communication link 710 between the UE 104-I and the base station 102/180-D. For example, the UE 104-I may use a RIS 705-A to communicate with the base station 102/180-D via a communication link 710-A. The RIS 705-A may be configured with reflection angles 715-A. In some aspects, the reflection angles 715-A may include an uplink reflection angle, a downlink reflection angle, or both. As the UE 104-I moves, signals transmitted by the UE 104-I and reflected by the RIS 705-A may fail to reach the base station 102/180-D (e.g., based on the reflection angles 715-A and the new location of the UE 104-I). As such, if the UE 104-I moves to a new location, the UE 104-I may receive reflected signals from the base station 102/180-D with reduced signal quality. That is, the reflection angles 715-A of the RIS 705-A may not properly reflect signals from the base station 102/180-D to the new location of the UE 104-I and vice versa.

However, as described herein with reference to FIG. 6, the UE 104-I may have access to configuration information for other RISs 705 in the network. In some aspects, the configuration information may include locations and reflection angles 715 for nearby RISs 705. In some other aspects, the reflection angles 715 may include uplink reflection angles, downlink reflection angles, or both. For example, the configuration information may include a location and reflection angles 715-A for a RIS 705-A, a location and reflection angles 715-B for a RIS 705-B, a location and reflection angles 715-C for a RIS 705-C, a location and reflection angles 715-D for a RIS 705-D, and a location and reflection angles 715-E for a RIS 705-E. In some examples, the reflection angles 715 of a RIS 705 may be based on a relationship (e.g., a mapping) between an angle of arrival (AoA) and an angle of departure (AoD) of signals reflected by the RIS 705. For example, if a signal arrives at the RIS 705-D with an AoA of 30 degrees and the RIS 705-D has a reflection angle of 110 degrees, the signal may depart from the RIS 705-D with an AoD of 40 degrees. Specifically, the signal deflection may be based on Equation 1 below. In some aspects, the relationship between the AoA and the AoD for a RIS 705 may be different in uplink and downlink (e.g., the reflection behavior of the RIS 705 may not be reciprocal). As such, the reflection angles 715 of the RIS 705 may indicate an uplink reflection angle, a downlink reflection angle, or both. In some other aspects, the relationship between the AoA and the AoD for a RIS 705 may be the same in uplink and downlink (e.g., the reflection behavior of the RIS 705 may be reciprocal). As such, the reflection angles 715 of the RIS 705 may indicate a single reflection angle. Equation 1 below may correspond to uplink reflections, downlink reflections, or both.

$$AoD = (180° - \text{Reflection Angle}) - AoA \qquad (1)$$

In some examples, the base station 102/180-D may indicate, to the UE 104-I, explicit reflection angle mappings between an AoA and an AoD for a specific RIS 705. In some other examples, the base station 102/180-D may indicate relative reflection angle mappings (e.g., gradients) for the specific RIS 705 based on reflection angle mappings for another RIS 705. Similarly, the base station 102/180-D may indicate a relative location of the specific RIS 705 based on a location of another RIS 705. For example, the RIS 705-D and the RIS 705-E may be subsets of a larger RIS 720 (e.g., the RIS 705-D and the RIS 705-E may be sub-RISs of a total larger RIS 720). The base station 102/180-D may indicate, to the UE 104-I, configuration information for the larger RIS 720 based on relative configurations for the subsets. That is, the base station 102/180-D may indicate the reflection angles 715-E for the RIS 705-E as gradients of (e.g., offsets from) the reflection angles 715-D for the RIS 705-D and may indicate the location of the RIS 705-E relative to the location of the RIS 705-D. As such, by knowing or calculating the reflection angles 715-D and the gradients, the UE 104-I may determine the absolute reflection angles 715-E for the RIS 705-E. Similarly, by knowing the location of the RIS 705-D and a relative location of the RIS 705-E relative to the RIS 705-D, the UE 104-I may determine the absolute location of the RIS 705-E. Thus, the base station 102/180-D may refrain from transmitting explicit configuration information for each subset of a larger RIS 720, thereby avoiding the signaling overhead associated with transmitting such explicit configuration information. In some examples, the base station 102/180-D may use similar techniques to indicate relative information for separate RISs 705 that are not part of a larger RIS 720.

Based on the configuration information, the UE 104-I may determine which RIS 705 is configured to reflect signals between the new location of the UE 104-I and the base station 102/180-D more effectively than the RIS 705-A. Thus, the UE 104-I may perform a handover procedure from the RIS 705-A to one of the other nearby RISs 705. For example, the UE 104-I may determine, based on previously acquired configuration information, that the RIS 705-E is configured with reflection angles 715-E that reflect communications between the base station 102/180-D and the UE 104-I at the new location more effectively than the RIS 705-A. Based on this determination, the UE 104-I may perform a handover procedure from the RIS 705-A to the RIS 705-E. In some aspects, the UE 104-I may perform the handover procedure without an input from the base station 102/180-D. For example, the base station 102/180-D may not be involved in the handover procedure. Such a handover procedure may be transparent to the base station 102/180-D, or the UE 104-I may transmit an indication of the handover to the base station 102/180-D. Responsive to performing the handover procedure, the UE 104-I may use the RIS 705-E to communicate with the base station 102/180-D via the communication link 710-B. In some other aspects, the base station 102/180-D may trigger the RIS handover for the UE 104-I, or the UE 104-I may request—and the base station 102/180-D may confirm—a RIS handover.

Figure 8:
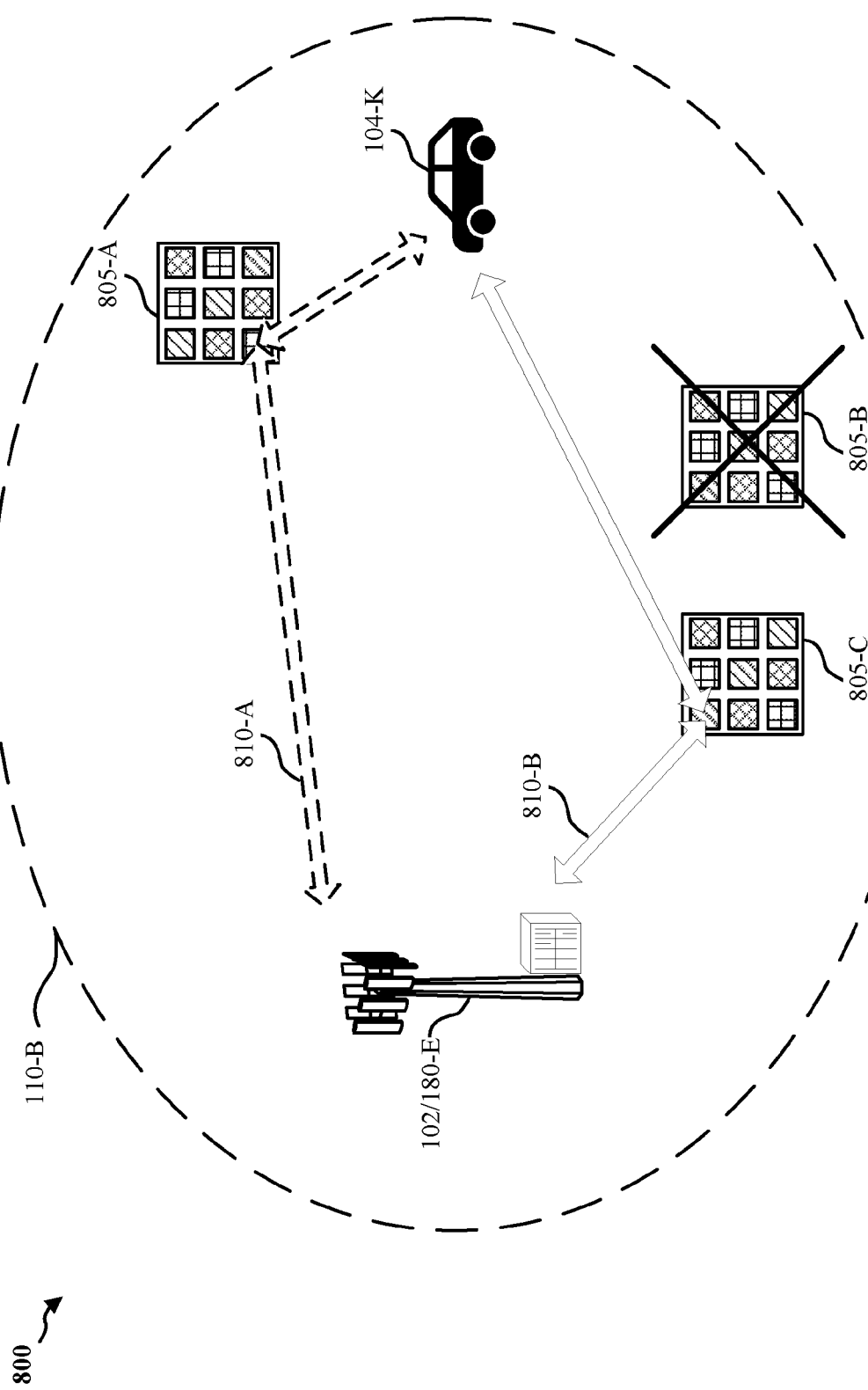
FIG. 8 illustrates an example of a wireless communications system.

FIG. 8 illustrates an example of a wireless communications system 800. The wireless communications system 800 may implement aspects of the wireless communications systems 100 and 400 through 700. For example, the wireless communications system 800 may include a UE 104-K and a base station 102/180-E, which may be examples of corresponding devices described herein with reference to FIGS. 1 and 4 through 7. The base station 102/180-E may determine to bar at least one UE (e.g., the UE 104-K) from communicating with one or more RISs (e.g., the RIS 805-B). For example, the base station 102/180-E may determine to bar the RIS 805-B for the UE 104-K when the RIS 805-B is already being utilized by a number of other UEs, and has reached its serving capacity, or for any other reasons. The base station 102/180-E may transmit a barring indication to the UE 104-K. The barring indication may be transmitted via a MAC-CE, an RRC message, or a DCI message (e.g., via a PDCCH). The barring indication may be broadcast to a plurality of UEs 104 including the UE 104-K. The barring indication may specify the RIS 805-B, and may serve to indicate to the UE 104-K that the UE 104-K should refrain from communicating with a base station 102/180 via the RIS 805-B. An identifier of the RIS 805-B or the location of the RIS 805-B may be utilized to specify the RIS 805-B in the barring indication. In one aspect, the barring indication may further include a time interval during which the UE 104-K is barred from communicating with the RIS 805-B. After the expiry of the time interval, the bar may be removed automatically, and the UE 104-K may again be free to communicate with the RIS 805-B.

In one aspect, the UE 104-K may determine that it does not recognize the identifier of the RIS 805-B in the barring indication (i.e., the identifier may be unidentifiable). In this scenario, the UE 104-K may transmit to the base station 102/180-E, via a UCI message, a request for further RIS information for the RIS 805-B. Upon receiving the request, the base station 102/180-E may transmit the requested further RIS information for the RIS 805-B to the UE 104-K. The further RIS information may assist the UE 104-K in identifying the barred RIS 805-B.

In a different aspect, the base station 102/180-E may transmit a barring indication that indicates all RISs 805 (e.g., RISs 805-A, 805-B, and 805-C) within the cell/coverage area 110-B of the base station 102/180-E are barred (e.g., for at least one UE 104-K).

Based on the received barring indication, the UE 104-K may determine to refrain from communicating with the RIS 805-B. Subsequently, the UE 104-K and the base station 102/180-E may communicate with each other either directly or via other RISs 805 (e.g., the RIS 805-C) excluding the RIS 805-B. In FIG. 8, the UE 104-K may initially communicate with the base station 102/180-E via the RIS 805-A and the communication link 810-A. As the UE 104-K changes its location, it may determine to perform a handover procedure to a different RIS that may better facilitate the communication between the UE 104-K and the base station 102/180-E. Absent the barring indication, both the RIS 805-B and the RIS 805-C may be candidate target RISs for the handover procedure. However, after receiving the barring indication, the UE 104-K may refrain from communicating with the RIS 805-B, and may further refrain from treating the RIS 805-B as a candidate target RIS for the handover procedure. Accordingly, the UE 104-K may perform a handover procedure from the RIS 805-A to the RIS 805-C, and may henceforth communicate with the base station 102/180-E via the RIS 805-C and the communication link 810-B. Alternatively, the UE 104-K may communicate with the base station 102/180-E directly.

Figure 9:
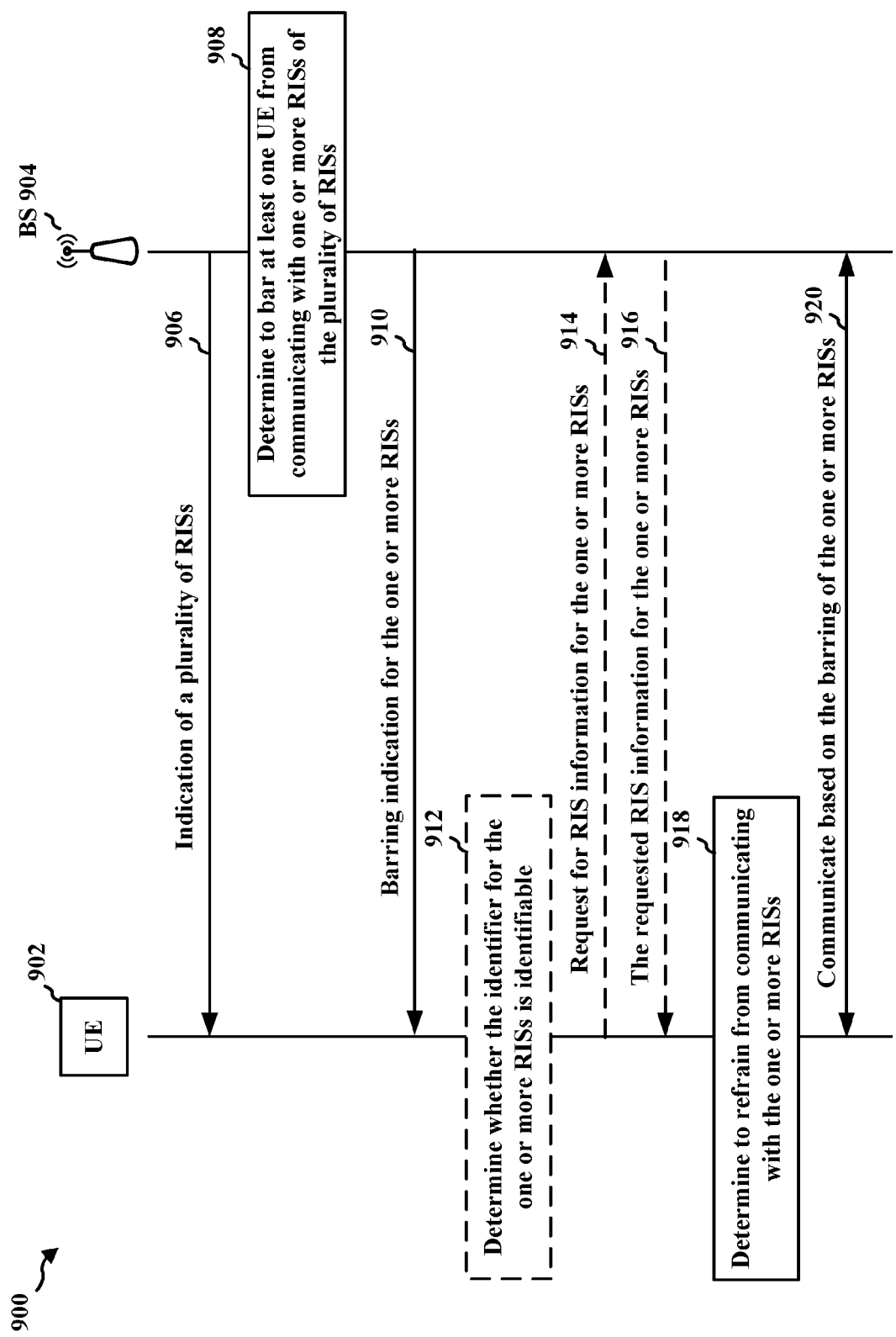
FIG. 9 is an example communication flow of a method of wireless communication.

FIG. 9 is an example communication flow 900 of a method of wireless communication according to aspects. The UE 902 may correspond to the UE 104-K in FIG. 8, and the base station 904 may correspond to the base station 102/180-E in FIG. 8. At 906, the base station 904 may transmit to the UE 902, and the UE 902 may receive from the base station 904, an indication of a plurality of RISs. The indication may include at least one of a configuration of each of the plurality of RISs or a location of each of the plurality of RISs. In particular, the configuration of a RIS may include a mapping between an AoA and an AoD of signals reflected by the RIS. At 908, the base station 904 may determine to bar at least one UE (e.g., the UE 902) from communicating with one or more RISs of the plurality of RISs. For example, the base station 904 may determine to bar the one or more RISs for the UE 902 when each of the one or more RISs is already being utilized by a number of other UEs, and has reached the serving capacity of the respective RIS (i.e., a number of other UEs utilizing the one or more RISs may be greater than a threshold), or for any other reasons. At 910, the base station 904 may transmit to the UE 902, and the UE 902 may receive from the base station 904, a barring indication. The barring indication may be transmitted via a MAC-CE, an RRC message, or a DCI message (e.g., via a PDCCH). The barring indication may be broadcast to a plurality of UEs including the at least one UE 902. The barring indication may specify the one or more RISs, and may serve to indicate to the at least one UE 902 that the at least one UE 902 should refrain from communicating with the base station 904 via the one or more RISs. An identifier of the one or more RISs or the location of the one or more RISs may be utilized to specify the one or more RISs in the barring indication. In one aspect, the barring indication may further include a time interval during which the at least one UE 902 is barred from communicating with the one or more RISs. After the expiry of the time interval, the bar may be removed automatically, and the at least UE 902 may again be free to communicate with the one or more RISs.

In one aspect, at 912, the UE 902 may determine whether the identifier for the one or more RISs is identifiable. In other words, the UE 902 may determine whether it can recognize the identifier for the one or more RISs in the barring indication. Upon determining that the identifier for the one or more RISs is not identifiable, at 914, the UE 902 may transmit to the base station 904, and the base station 904 may receive from the UE 902, via a UCI message, a request for further RIS information for the one or more RISs. Upon receiving the request, at 916, the base station 904 may transmit to the UE 902, and the UE 902 may receive from the base station 904, the requested further RIS information for the one or more RISs. The further RIS information may assist the UE 902 in identifying the one or more RISs.

In a different aspect, at 910, the base station 904 may transmit to the UE 902, and the UE 902 may receive from the base station 904, a barring indication that indicates all RISs within the cell/coverage area of the base station 904 are barred (e.g., for at least one UE 902).

Based on the received barring indication, at 918, the UE 902 may determine to refrain from communicating with the one or more RISs. Subsequently, at 920, the UE 902 and the base station 904 may communicate with each other either directly or via other RISs excluding the one or more RISs, such that the UE 902 may not communicate with the one or more RISs.

Figure 10:
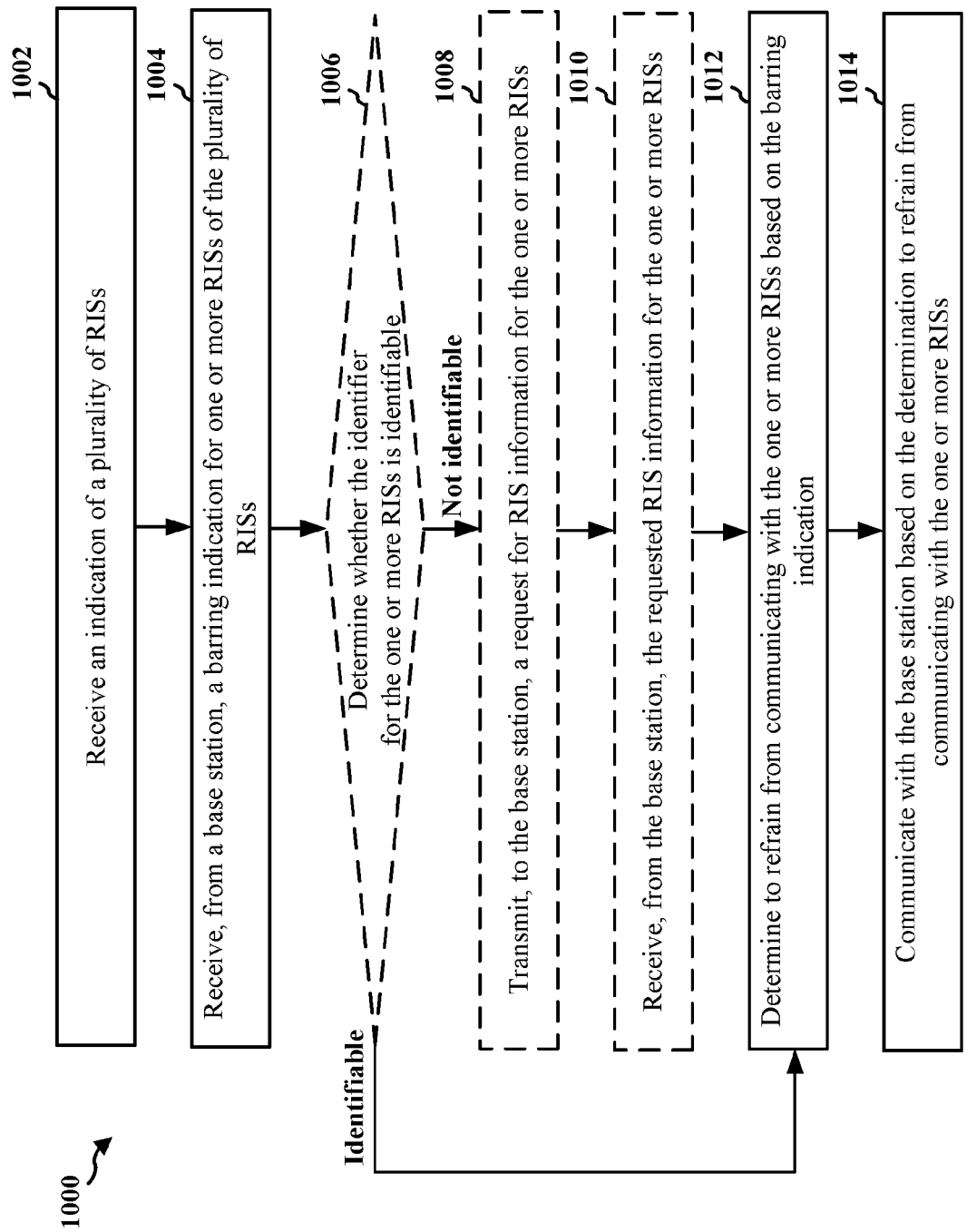
FIG. 10 is a flowchart of a method of wireless communication.

FIG. 10 is a flowchart 1000 of a method of wireless communication. The method may be performed by a UE (e.g., the UE 104; the UE 902; the apparatus 1202). At 1004, the UE may receive, from a base station, a barring indication for one or more RISs of a plurality of RISs. The barring indication may identify the one or more RISs with which the UE is barred from communicating. For example, 1004 may be performed by the RIS barring component 1240 in FIG. 12. For example, at 910, the UE 902 may receive, from a base station 904, a barring indication for one or more RISs of a plurality of RISs.

At 1012, the UE may determine to refrain from communicating with the one or more RISs based on the barring indication. For example, 1012 may be performed by the RIS barring component 1240 in FIG. 12. For example, at 918, the UE 902 may determine to refrain from communicating with the one or more RISs based on the barring indication.

At 1014, the UE may communicate with the base station based on the determination to refrain from communicating with the one or more RISs. For example, 1014 may be performed by the RIS barring component 1240 in FIG. 12. For example, at 920, the UE 902 may communicate with the base station 904 based on the determination to refrain from communicating with the one or more RISs.

At 1002, the UE may receive from the base station an indication of the plurality of RISs. The indication may include at least one of a configuration of each of the plurality of RISs or a location of each of the plurality of RISs. For example, 1002 may be performed by the RIS barring component 1240 in FIG. 12. For example, at 906, the UE 902 may receive an indication of the plurality of RISs.

In one configuration, the configuration of each of the plurality of RISs may include a mapping between an AoA and an AoD of signals reflected by the RIS. In one configuration, the barring indication may include at least one of an identifier for the one or more RISs, a time interval during which the UE is barred from communicating with the one or more RISs, or a location of the one or more RISs.

In one configuration, the barring indication may include an identifier for the one or more RISs. At 1006, the UE may determine whether the identifier for the one or more RISs is identifiable. For example, 1006 may be performed by the RIS barring component 1240 in FIG. 12. For example, at 912, the UE 902 may determine whether the identifier for the one or more RISs is identifiable. Upon determining that the identifier for the one or more RISs is not identifiable, at 1008, the UE may transmit, to the base station, a request for RIS information for the one or more RISs. For example, 1008 may be performed by the RIS barring component 1240 in FIG. 12. For example, at 914, the UE 902 may transmit, to the base station 904, a request for RIS information for the one or more RISs.

In one configuration, the request for RIS information may be transmitted to the base station via a UCI message.

At 1010, the UE may receive, from the base station, the requested RIS information for the one or more RISs. For example, 1010 may be performed by the RIS barring component 1240 in FIG. 12. For example, at 916, the UE 902 may receive, from the base station 904, the requested RIS information for the one or more RISs.

In one configuration, the barring indication may indicate the one or more RISs are within a cell. In one configuration, the barring indication may be received from the base station via a MAC-CE, an RRC message, or a DCI message. In one configuration, the UE may communicate with the base station via at least one other RIS excluding the one or more RISs or communicates directly with the base station.

Figure 11:
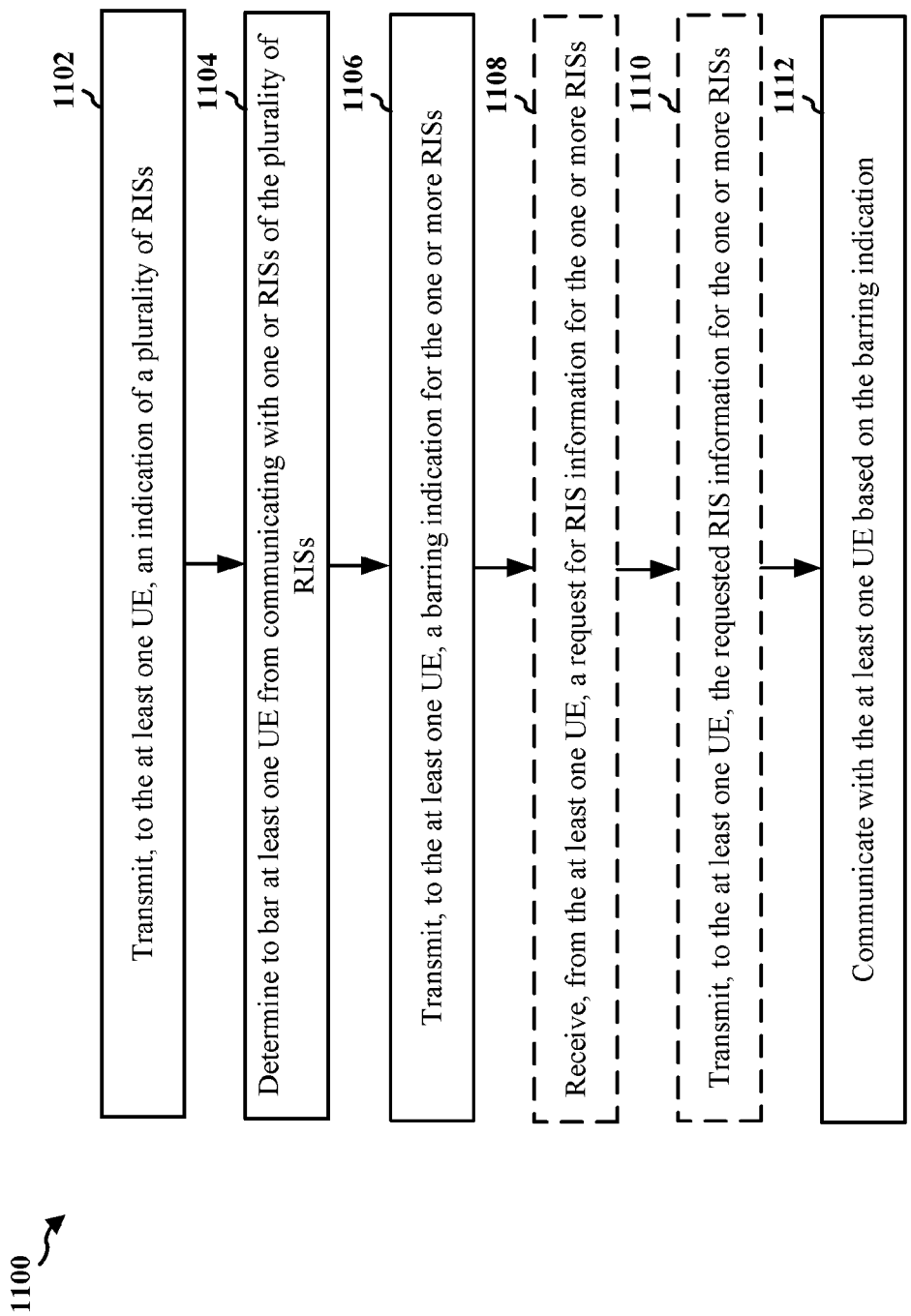
FIG. 11 is a flowchart of a method of wireless communication.

FIG. 11 is a flowchart 1100 of a method of wireless communication. The method may be performed by a base station (e.g., the base station 102/180; the base station 904; the apparatus 1302). At 1104, the base station may determine to bar at least one UE from communicating with one or more RISs of a plurality of RISs. For example, 1104 may be performed by the RIS barring component 1340 in FIG. 13. For example, at 908, the base station 904 may determine to bar at least one UE 902 from communicating with one or more RISs of a plurality of RISs.

At 1106, the base station may transmit, to the at least one UE, a barring indication for the one or more RISs. The barring indication may identify the one or more RISs with which the at least one UE is barred from communicating. For example, 1106 may be performed by the RIS barring component 1340 in FIG. 13. For example, at 910, the base station 904 may transmit, to the at least one UE 902, a barring indication for the one or more RISs.

At 1112, the base station may communicate with the at least one UE based on the barring indication. For example, 1112 may be performed by the RIS barring component 1340 in FIG. 13. For example, at 920, the base station 904 may communicate with the at least one UE 902 based on the barring indication.

At 1102, the base station may transmit, to the at least one UE, an indication of the plurality of RISs. The indication may include at least one of a configuration of each of the plurality of RISs or a location of each of the plurality of RISs. For example, 1102 may be performed by the RIS barring component 1340 in FIG. 13. For example, at 906, the base station 904 may transmit, to the at least one UE 902, an indication of the plurality of RISs In one configuration, the configuration of each of the plurality of RISs may include a mapping between an AoA and an AoD of signals reflected by the RIS.

In one configuration, the barring indication may include at least one of an identifier for the one or more RISs, a time interval during which the at least one UE is barred from communicating with the one or more RISs, or a location of the one or more RISs.

In one configuration, the barring indication may include an identifier for the one or more RISs. At 1108, the base station may receive, from the at least one UE, a request for RIS information for the one or more RISs. For example, 1108 may be performed by the RIS barring component 1340 in FIG. 13. For example, at 914, the base station 904 may receive, from the at least one UE 902, a request for RIS information for the one or more RISs.

In one configuration, the request for RIS information may be received from the at least one UE via a UCI message.

At 1110, the base station may transmit, to the at least one UE, the requested RIS information for the one or more RISs. For example, 1110 may be performed by the RIS barring component 1340 in FIG. 13. For example, at 916, the base station 904 may transmit, to the at least one UE 902, the requested RIS information for the one or more RISs.

In one configuration, the barring indication may indicate the one or more RISs are within a cell. In one configuration, the barring indication may be transmitted to the at least one UE via a MAC-CE, an RRC message, or a DCI message.

In one configuration, the barring indication may be broadcast to a plurality of UEs including the at least one UE. In one configuration, the barring indication may be broadcast via a PDCCH.

In one configuration, the base station may communicate with the at least one UE via at least one other RIS excluding the one or more RISs or communicates directly with the at least one UE.

In one configuration, determining to bar the at least one UE from communicating with the one or more RISs may be based on a determination that a number of other UEs utilizing the one or more RISs is greater than a threshold.

Figure 12:
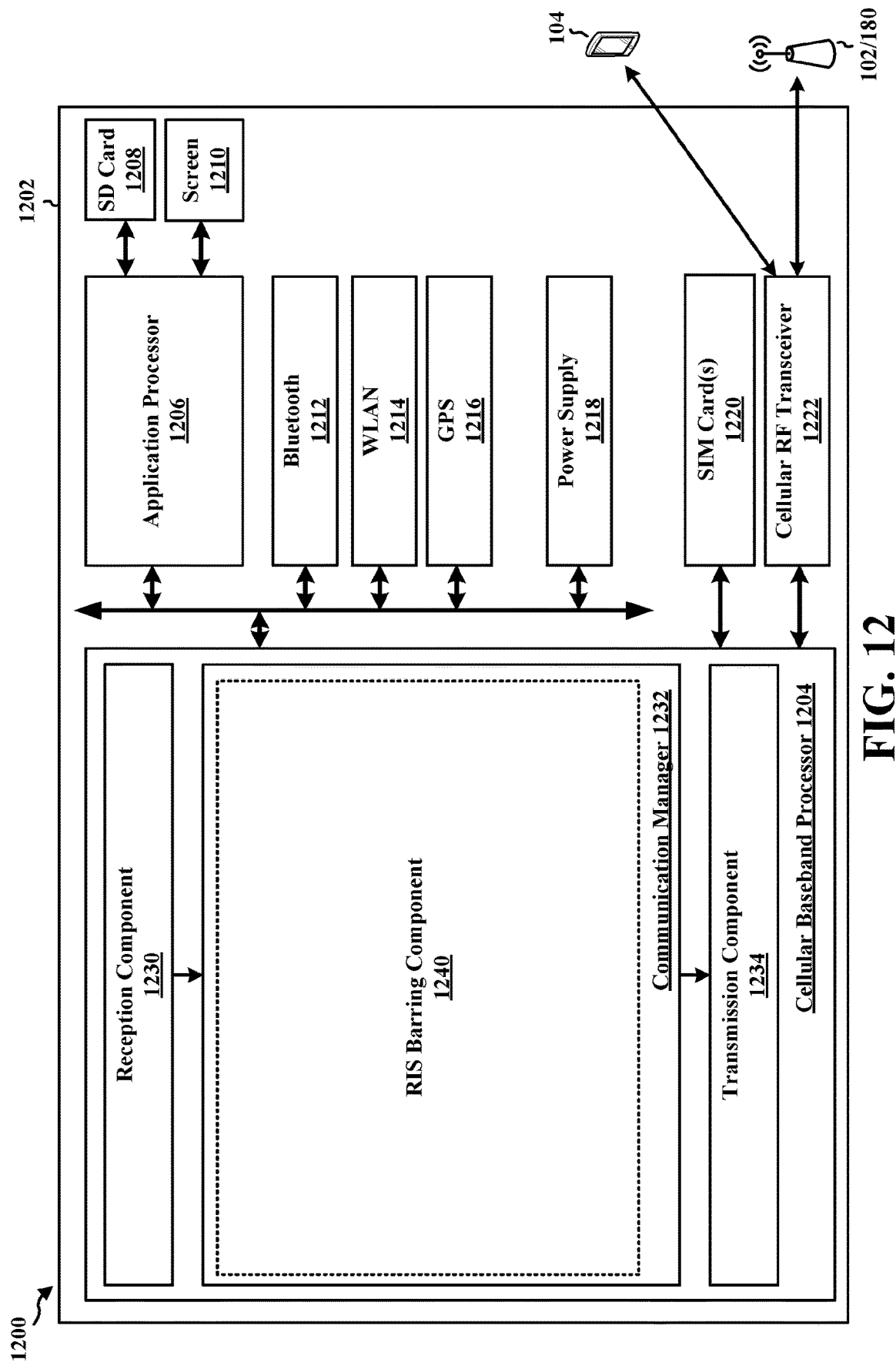
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a RIS barring component 1240 that may be configured to receive, from a base station, a barring indication for one or more RISs of a plurality of RISs, e.g., as described in connection with 1004 in FIG. 10. The barring indication may identify the one or more RISs with which the UE is barred from communicating. The RIS barring component 1240 may be further configured to determine to refrain from communicating with the one or more RISs based on the barring indication, e.g., as described in connection with 1012 in FIG. 10. The RIS barring component 1240 may be further configured to communicate with the base station based on the determination to refrain from communicating with the one or more RISs, e.g., as described in connection with 1014 in FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving, from a base station, a barring indication for one or more RISs of a plurality of RISs. The barring indication may identify the one or more RISs with which the UE is barred from communicating. The apparatus 1202 may further include means for determining to refrain from communicating with the one or more RISs based on the barring indication. The apparatus 1202 may further include means for communicating with the base station based on the determination to refrain from communicating with the one or more RISs.

The apparatus 1202 may further include means for receiving an indication of the plurality of RISs. The indication may include at least one of a configuration of each of the plurality of RISs or a location of each of the plurality of RISs. In one configuration, the configuration of each of the plurality of RISs may include a mapping between an AoA and an AoD of signals reflected by the RIS. In one configuration, the barring indication may include at least one of an identifier for the one or more RISs, a time interval during which the UE is barred from communicating with the one or more RISs, or a location of the one or more RISs. In one configuration, the barring indication may include an identifier for the one or more RISs. The apparatus 1202 may further include means for determining whether the identifier for the one or more RISs is identifiable; and means for transmitting, to the base station upon determining that the identifier for the one or more RISs is not identifiable, a request for RIS information for the one or more RISs. In one configuration, the request for RIS information is transmitted to the base station via a UCI message. The apparatus 1202 may further include means for receiving, from the base station, the requested RIS information for the one or more RISs. In one configuration, the barring indication may indicate the one or more RISs are within a cell. In one configuration, the barring indication may be received from the base station via a MAC-CE, an RRC message, or a DCI message. In one configuration, the UE may communicate with the base station via at least one other RIS excluding the one or more RISs or communicates directly with the base station.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
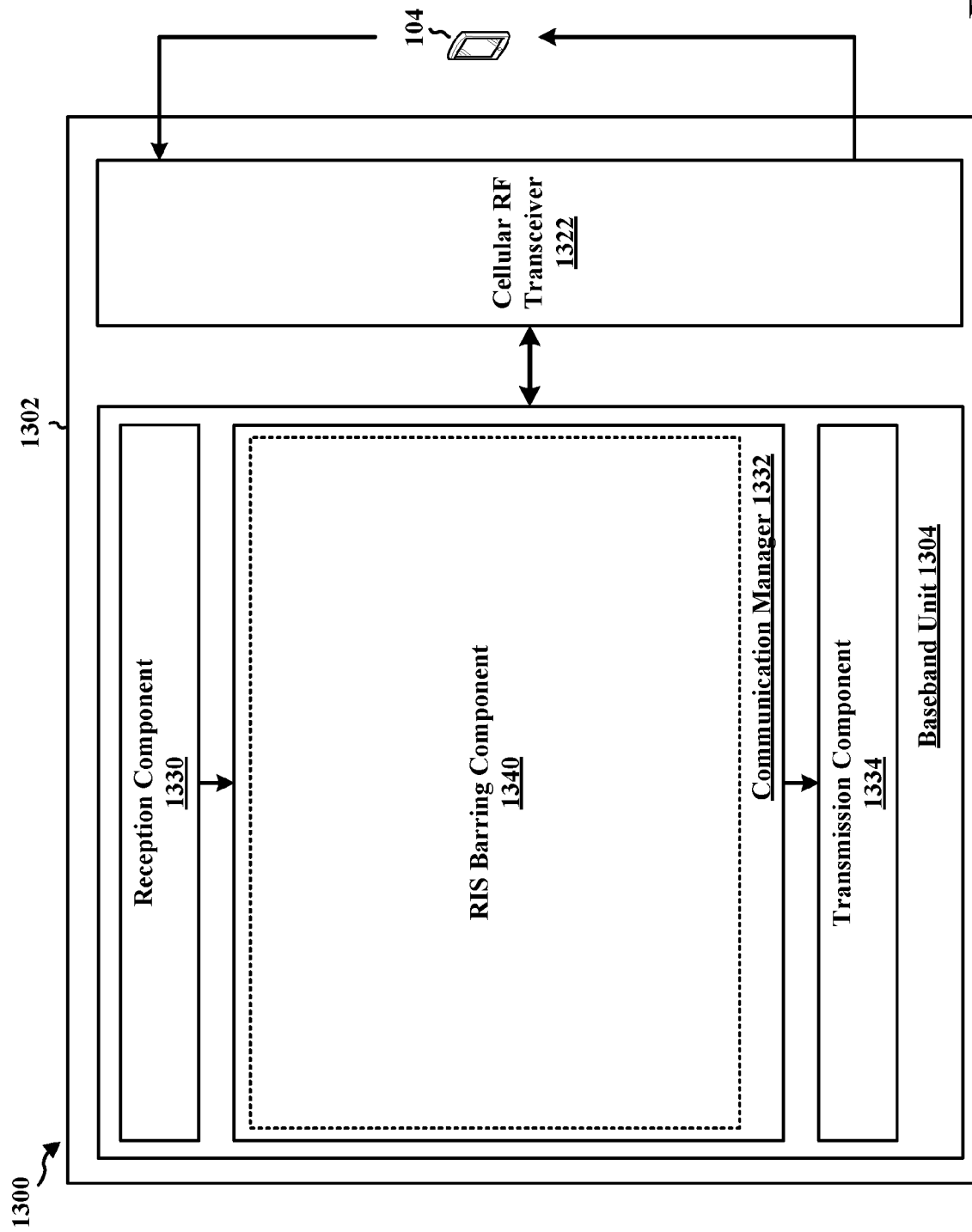
FIG. 13 is a diagram illustrating an example of a hardware implementation for an example apparatus.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a RIS barring component 1340 that may be configured to determine to bar at least one UE from communicating with one or more RISs of a plurality of RISs, e.g., as described in connection with 1104 in FIG. 11. The RIS barring component 1340 may be further configured to transmit, to the at least one UE, a barring indication for the one or more RISs, e.g., as described in connection with 1106 in FIG. 11. The barring indication may identify the one or more RISs with which the at least one UE is barred from communicating. The RIS barring component 1340 may be further configured to communicate with the at least one UE based on the barring indication, e.g., as described in connection with 1112 in FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for determining to bar at least one UE from communicating with one or more RISs of a plurality of RISs. The apparatus 1302 may further include means for transmitting, to the at least one UE, a barring indication for the one or more RISs. The barring indication may identify the one or more RISs with which the at least one UE is barred from communicating. The apparatus 1302 may further include means for communicating with the at least one UE based on the barring indication.

The apparatus 1302 may further include means for transmitting, to the at least one UE, an indication of the plurality of RISs. The indication may include at least one of a configuration of each of the plurality of RISs or a location of each of the plurality of RISs. In one configuration, the configuration of each of the plurality of RISs may include a mapping between an AoA and an AoD of signals reflected by the RIS. In one configuration, the barring indication may include at least one of an identifier for the one or more RISs, a time interval during which the at least one UE is barred from communicating with the one or more RISs, or a location of the one or more RISs. In one configuration, the barring indication may include an identifier for the one or more RISs. The apparatus 1302 may further include means for receiving, from the at least one UE, a request for RIS information for the one or more RISs. In one configuration, the request for RIS information may be received from the at least one UE via a UCI message. The apparatus 1302 may further include means for transmitting, to the at least one UE, the requested RIS information for the one or more RISs. In one configuration the barring indication indicates the one or more RISs are within a cell. In one configuration, the barring indication may be transmitted to the at least one UE via a MAC-CE, an RRC message, or a DCI message. In one configuration, the barring indication may be broadcast to a plurality of UEs including the at least one UE. In one configuration, the barring indication may be broadcast via a PDCCH. In one configuration, the base station may communicate with the at least one UE via at least one other RIS excluding the one or more RISs or communicates directly with the at least one UE. In one configuration, the determining to bar the at least one UE from communicating with the one or more RISs may be based on a determination that a number of other UEs utilizing the one or more RISs is greater than a threshold.

The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

According to aspects described above, at least one UE may be barred from communicating with one or more RISs. In particular, the base station may determine to bar at least one UE from communicating with one or more RISs of a plurality of RISs. The base station may transmit, to the at least one UE, a barring indication for the one or more RISs. The barring indication may identify the one or more RISs with which the at least one UE is barred from communicating. The UE may determine to refrain from communicating with the one or more RISs based on the barring indication. The UE may communicate with the base station based on the determination to refrain from communicating with the one or more RISs. Accordingly, when advantageous, access by at least one UE to the one or more RISs may be barred in a simple and flexible manner.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, including: receiving, from a base station, a barring indication for one or more RISs of a plurality of RISs, the barring indication identifying the one or more RISs with which the UE is barred from communicating; determining to refrain from communicating with the one or more RISs based on the barring indication; and communicating with the base station based on the determination to refrain from communicating with the one or more RISs.

Aspect 2 is the method of aspect 1, further including: receiving an indication of the plurality of RISs, where the indication includes at least one of a configuration of each of the plurality of RISs or a location of each of the plurality of RISs.

Aspect 3 is the method of aspect 2, where the configuration of each of the plurality of RISs includes a mapping between an AoA and an AoD of signals reflected by the RIS.

Aspect 4 is the method of any of aspects 1 to 3, where the barring indication includes at least one of an identifier for the one or more RISs, a time interval during which the UE is barred from communicating with the one or more RISs, or a location of the one or more RISs.

Aspect 5 is the method of aspect 4, where the barring indication includes an identifier for the one or more RISs, the method further including: determining whether the identifier for the one or more RISs is identifiable; and transmitting, to the base station upon determining that the identifier for the one or more RISs is not identifiable, a request for RIS information for the one or more RISs.

Aspect 6 is the method of aspect 5, where the request for RIS information is transmitted to the base station via a UCI message.

Aspect 7 is the method of aspect 5, further including: receiving, from the base station, the requested RIS information for the one or more RISs.

Aspect 8 is the method of any of aspects 1 to 7, where the barring indication indicates the one or more RISs are within a cell.

Aspect 9 is the method of any of aspects 1 to 8, where the barring indication is received from the base station via a MAC-CE, an RRC message, or a DCI message.

Aspect 10 is the method of any of aspects 1 to 9, where the UE communicates with the base station via at least one other RIS excluding the one or more RISs or communicates directly with the base station.

Aspect 11 is a method of wireless communication at a base station, including: determining to bar at least one UE from communicating with one or more RISs of a plurality of RISs; transmitting, to the at least one UE, a barring indication for the one or more RISs, the barring indication identifying the one or more RISs with which the at least one UE is barred from communicating; and communicating with the at least one UE based on the barring indication.

Aspect 12 is the method of aspect 11, further including: transmitting, to the at least one UE, an indication of the plurality of RISs, where the indication includes at least one of a configuration of each of the plurality of RISs or a location of each of the plurality of RISs.

Aspect 13 is the method of aspect 12, where the configuration of each of the plurality of RISs includes a mapping between an AoA and an AoD of signals reflected by the RIS.

Aspect 14 is the method of any of aspects 11 to 13, where the barring indication includes at least one of an identifier for the one or more RISs, a time interval during which the at least one UE is barred from communicating with the one or more RISs, or a location of the one or more RISs.

Aspect 15 is the method of aspect 14, where the barring indication includes an identifier for the one or more RISs, the method further including: receiving, from the at least one UE, a request for RIS information for the one or more RISs.

Aspect 16 is the method of aspect 15, where the request for RIS information is received from the at least one UE via a UCI message.

Aspect 17 is the method of aspect 15, further including: transmitting, to the at least one UE, the requested RIS information for the one or more RISs.

Aspect 18 is the method of any of aspects 11 to 17, where the barring indication indicates the one or more RISs are within a cell.

Aspect 19 is the method of any of aspects 11 to 18, where the barring indication is transmitted to the at least one UE via a IAC-CE, an RRC message, or a DCI message.

Aspect 20 is the method of any of aspects 11 to 19, where the barring indication is broadcast to a plurality of UEs including the at least one UE.

Aspect 21 is the method of aspect 20, where the barring indication is broadcast via a PDCCH.

Aspect 22 is the method of any of aspects 11 to 21, where the base station communicates with the at least one UE via at least one other RIS excluding the one or more RISs or communicates directly with the at least one UE.

Aspect 23 is the method of any of aspects 11 to 22, where the determining to bar the at least one UE from communicating with the one or more RISs is based on a determination that a number of other UEs utilizing the one or more RISs is greater than a threshold.

Aspect 24 is an apparatus for wireless communication including at least one processor coupled to a memory and configured to implement a method as in any of aspects 1 to 23.

Aspect 25 is an apparatus for wireless communication including means for implementing a method as in any of aspects 1 to 23.

Aspect 26 is a computer-readable medium storing computer executable code, where the code when executed by a processor causes the processor to implement a method as in any of aspects 1 to 23.

What is claimed is:

1. A method of wireless communication at a user equipment (UE), comprising:
   receiving, from a base station, a barring indication for one or more reconfigurable intelligent surfaces (RISs) of a plurality of RISs, the barring indication identifying the one or more RISs with which the UE is barred from communicating;
   determining to refrain from communicating with the one or more RISs based on the barring indication; and
   communicating with the base station based on the determination to refrain from communicating with the one or more RISs.

2. The method of claim 1, further comprising:
   receiving an indication of the plurality of RISs, wherein the indication includes at least one of a configuration of each of the plurality of RISs or a location of each of the plurality of RISs.

3. The method of claim 2, wherein the configuration of each of the plurality of RISs comprises a mapping between an angle of arrival (AoA) and an angle of departure (AoD) of signals reflected by the RIS.

4. The method of claim 1, wherein the barring indication includes at least one of an identifier for the one or more RISs, a time interval during which the UE is barred from communicating with the one or more RISs, or a location of the one or more RISs.

5. The method of claim 4, wherein the barring indication includes an identifier for the one or more RISs, the method further comprising:
   determining whether the identifier for the one or more RISs is identifiable; and transmitting, to the base station upon determining that the identifier for the one or more RISs is not identifiable, a request for RIS information for the one or more RISs.

6. The method of claim 5, wherein the request for RIS information is transmitted to the base station via an uplink control information (UCI) message.

7. The method of claim 5, further comprising:
receiving, from the base station, the requested RIS information for the one or more RISs.

8. The method of claim 1, wherein the barring indication indicates the one or more RISs are within a cell.

9. The method of claim 1, wherein the barring indication is received from the base station via a media access control (MAC) control element (CE) (MAC-CE), a radio resource control (RRC) message, or a downlink control information (DCI) message.

10. The method of claim 1, wherein the UE communicates with the base station via at least one other RIS excluding the one or more RISs or communicates directly with the base station.

11. An apparatus for wireless communication, the apparatus being a user equipment (UE), comprising:
a memory; and
at least one processor coupled to the memory and configured to:
receive, from a base station, a barring indication for one or more reconfigurable intelligent surfaces (RISs) of a plurality of RISs, the barring indication identifying the one or more RISs with which the UE is barred from communicating;
determine to refrain from communicating with the one or more RISs based on the barring indication; and
communicate with the base station based on the determination to refrain from communicating with the one or more RISs.

12. The apparatus of claim 11, wherein the at least one processor is further configured to:
receive an indication of the plurality of RISs, wherein the indication includes at least one of a configuration of each of the plurality of RISs or a location of each of the plurality of RISs.

13. The apparatus of claim 12, wherein the configuration of each of the plurality of RISs comprises a mapping between an angle of arrival (AoA) and an angle of departure (AoD) of signals reflected by the RIS.

14. The apparatus of claim 11, wherein the barring indication includes at least one of an identifier for the one or more RISs, a time interval during which the UE is barred from communicating with the one or more RISs, or a location of the one or more RISs.

15. The apparatus of claim 14, wherein the barring indication includes an identifier for the one or more RISs, and the at least one processor is further configured to:
determine whether the identifier for the one or more RISs is identifiable; and
transmit, to the base station upon determining that the identifier for the one or more RISs is not identifiable, a request for RIS information for the one or more RISs.

16. The apparatus of claim 15, wherein the request for RIS information is transmitted to the base station via an uplink control information (UCI) message.

17. The apparatus of claim 15, wherein the at least one processor is further configured to:
receive, from the base station, the requested RIS information for the one or more RISs.

18. The apparatus of claim 11, wherein the barring indication indicates the one or more RISs are within a cell.

19. The apparatus of claim 11, wherein the barring indication is received from the base station via a media access control (MAC) control element (CE) (MAC-CE), a radio resource control (RRC) message, or a downlink control information (DCI) message.

20. The apparatus of claim 11, wherein the UE communicates with the base station via at least one other RIS excluding the one or more RISs or communicates directly with the base station.

21. An apparatus for wireless communication, the apparatus being a base station, comprising:
a memory; and
at least one processor coupled to the memory and configured to:
determine to bar at least one user equipment (UE) from communicating with one or more reconfigurable intelligent surfaces (RISs) of a plurality of RISs;
transmit, to the at least one UE, a barring indication for the one or more RISs, the barring indication identifying the one or more RISs with which the at least one UE is barred from communicating; and
communicate with the at least one UE based on the barring indication.

22. The apparatus of claim 21, wherein the at least one processor is further configured to:
transmit, to the at least one UE, an indication of the plurality of RISs, wherein the indication includes at least one of a configuration of each of the plurality of RISs or a location of each of the plurality of RISs.

23. The apparatus of claim 22, wherein the configuration of each of the plurality of RISs comprises a mapping between an angle of arrival (AoA) and an angle of departure (AoD) of signals reflected by the RIS.

24. The apparatus of claim 21, wherein the barring indication includes at least one of an identifier for the one or more RISs, a time interval during which the at least one UE is barred from communicating with the one or more RISs, or a location of the one or more RISs.

25. The apparatus of claim 24, wherein the barring indication includes an identifier for the one or more RISs, and the at least one processor is further configured to:
receive, from the at least one UE, a request for RIS information for the one or more RISs.

26. The apparatus of claim 25, wherein the request for RIS information is received from the at least one UE via an uplink control information (UCI) message.

27. The apparatus of claim 25, wherein the at least one processor is further configured to:
transmit, to the at least one UE, the requested RIS information for the one or more RISs.

28. The apparatus of claim 21, wherein the barring indication indicates the one or more RISs are within a cell.

29. The apparatus of claim 21, wherein the barring indication is transmitted to the at least one UE via a media access control (MAC) control element (CE) (MAC-CE), a radio resource control (RRC) message, or a downlink control information (DCI) message.

30. The apparatus of claim 21, wherein the barring indication is broadcast to a plurality of UEs including the at least one UE.

31. The apparatus of claim 30, wherein the barring indication is broadcast via a physical downlink control channel (PDCCH).

32. The apparatus of claim 21, wherein the base station communicates with the at least one UE via atleast one other RIS excluding the one or more RISs or communicates directly with the at least one UE.

33. The apparatus of claim 21, wherein the determining to bar the at least one UE from communicating with the one or more RISs is based on a determination that a number of other UEs utilizing the one or more RISs is greater than a threshold.

\* \* \* \* \*